(12) United States Patent
Yanagi et al.

(10) Patent No.: US 7,301,614 B2
(45) Date of Patent: Nov. 27, 2007

(54) LENS-REFRACTING CHARACTERISTIC MEASURING APPARATUS

(75) Inventors: Eiichi Yanagi, Tokyo (JP); Shinichi Nakamura, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 373 days.

(21) Appl. No.: 11/043,614

(22) Filed: Jan. 26, 2005

(65) Prior Publication Data

US 2005/0162641 A1 Jul. 28, 2005

(30) Foreign Application Priority Data

Jan. 28, 2004 (JP) ............... 2004-019445

(51) Int. Cl.
*G01B 9/00* (2006.01)
*A61B 3/00* (2006.01)

(52) U.S. Cl. ............ 356/124; 356/127; 351/200; 351/204

(58) Field of Classification Search ......... 356/124–127
See application file for complete search history.

(56) References Cited

U.S. PATENT DOCUMENTS

| 4,098,002 A | 7/1978 | Campbell et al. |
| 4,212,538 A | 7/1980 | Esmond |
| 5,152,067 A | 10/1992 | Kurachi et al. |
| 5,365,286 A * | 11/1994 | Masuda ............ 351/204 |
| 2004/0189935 A1* | 9/2004 | Warden et al. ....... 351/204 |

FOREIGN PATENT DOCUMENTS

| JP | 63-113419 | 5/1988 |
| JP | 08-029292 | 2/1996 |

\* cited by examiner

*Primary Examiner*—Tarifur Chowdhury
*Assistant Examiner*—Tara S Pajoohi
(74) *Attorney, Agent, or Firm*—Chapman and Cutler LLP

(57) ABSTRACT

A lens-refracting characteristic measuring apparatus includes a measuring optical device to measure refracting characteristics of eyeglass lenses, an input device to input a pupillary distance of eyes of a person wearing eyeglasses, and an arithmetic and control circuit for obtaining refracting characteristics of the eyeglass lenses in positions of centers of right and left pupils of the person wearing the eyeglasses based on the pupillary distance of right and left eyes of the person wearing the eyeglasses input by the input device and the refracting characteristics measured by the measuring optical device.

14 Claims, 33 Drawing Sheets

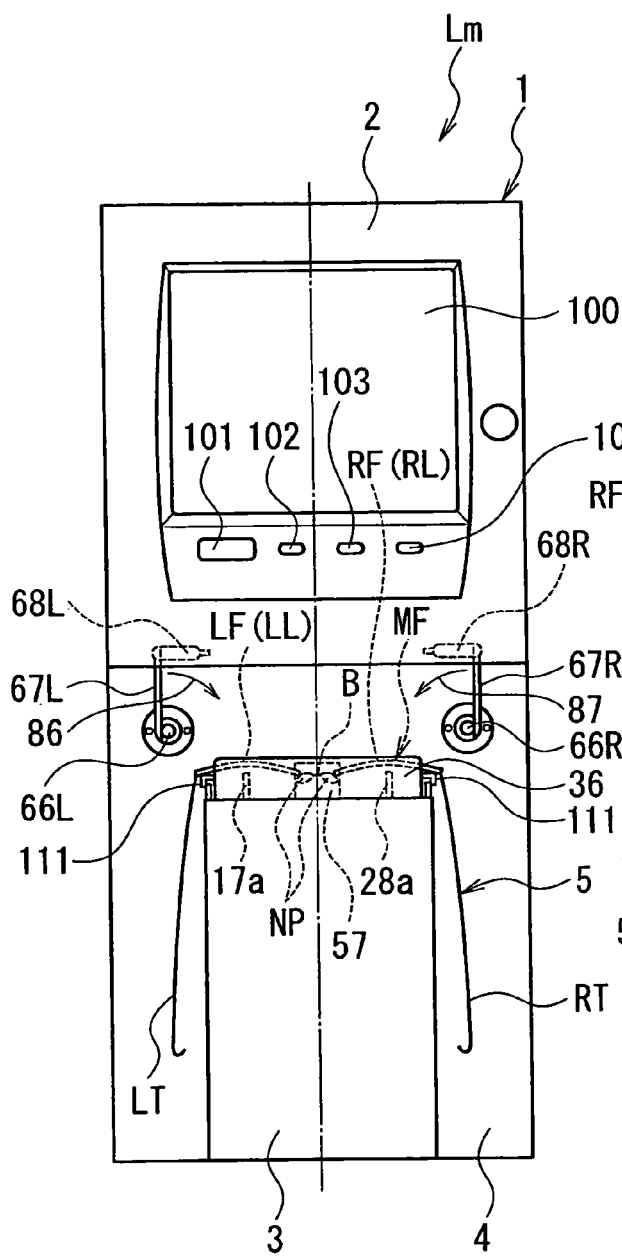
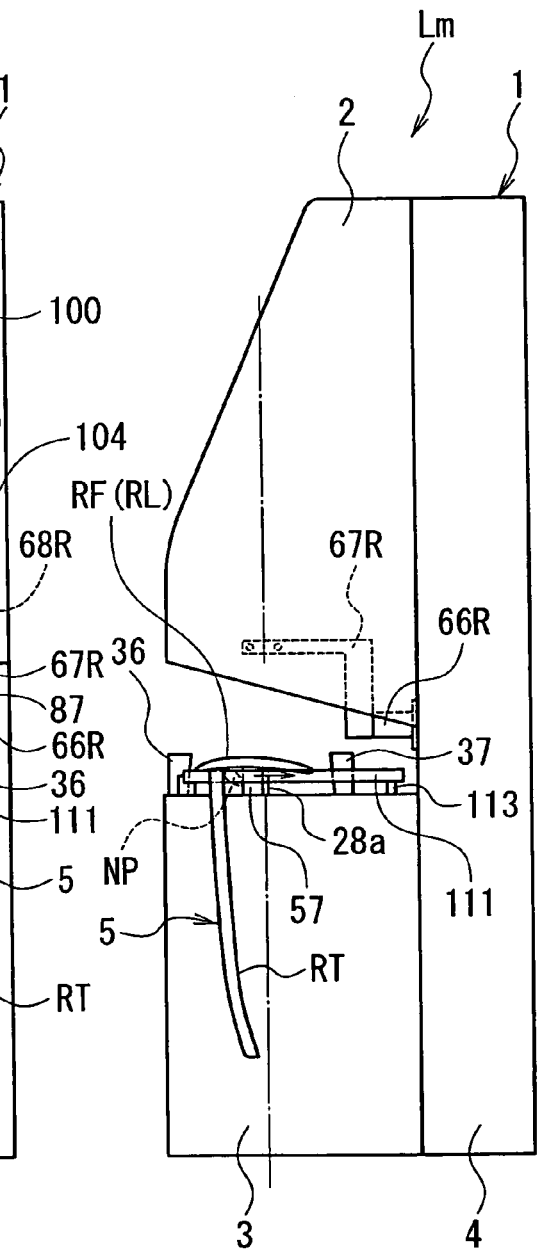

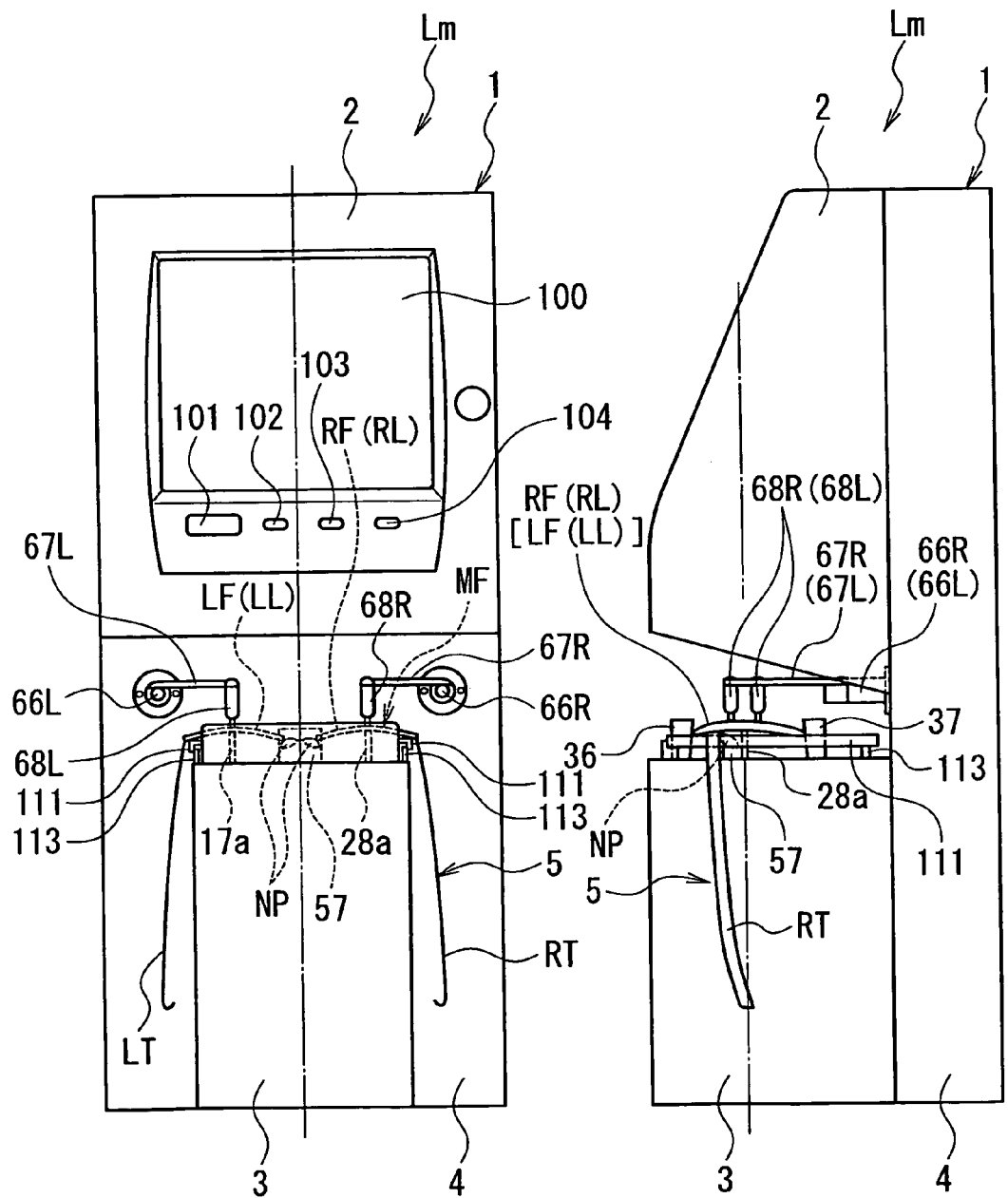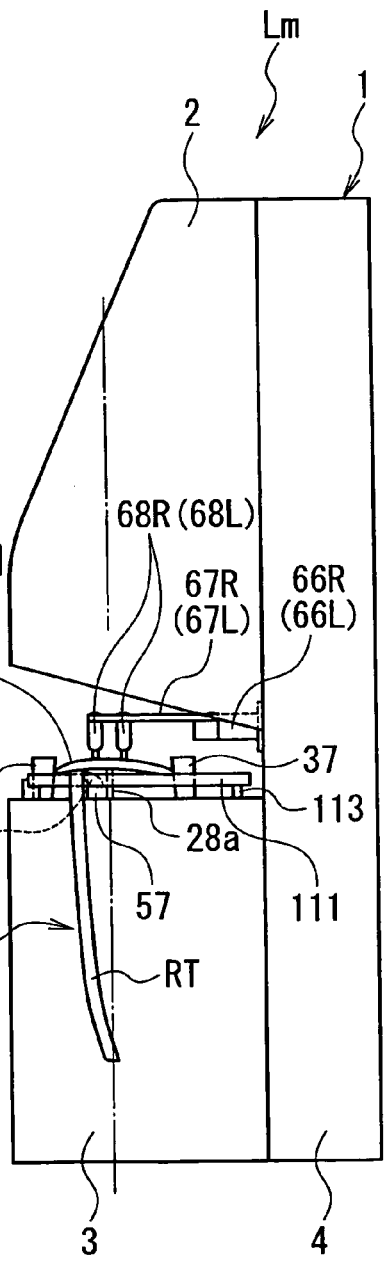

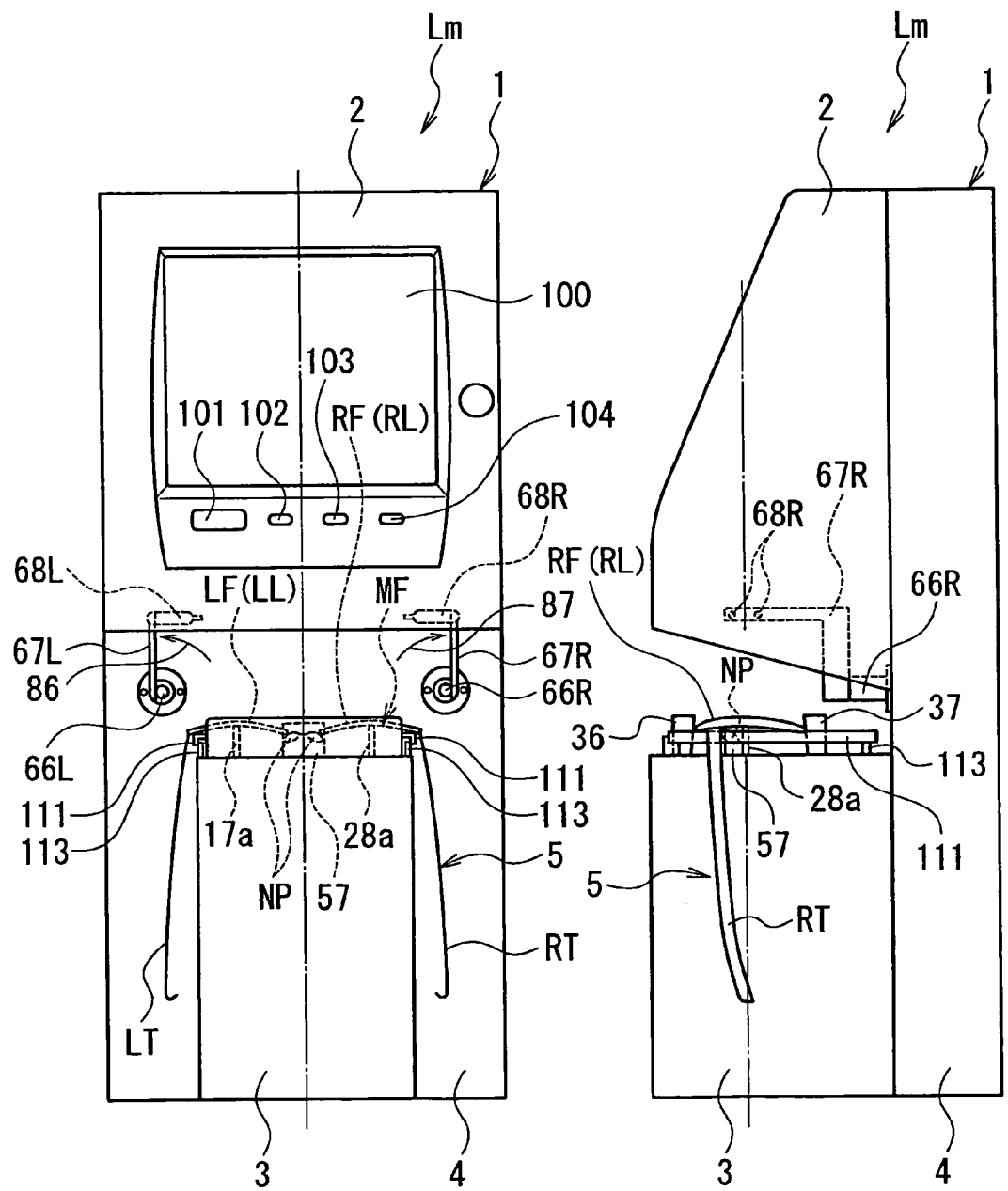

LENS-REFRACTING CHARACTERISTIC MEASURING APPARATUS

CROSS-REFERENCE TO THE RELATED APPLICATION

The application claims the priority benefit of Japanese Patent Application No. 2004-19445, field on Jan. 28, 2004, the entire description of which are incorporated herein by reference.

BACKGROUND OF THE INVENTION

1. Field of the Invention

The present invention relates to an apparatus for measuring a refracting characteristic of a lens, particularity eyeglass lenses, and more particularly to an apparatus for measuring a lens-refracting characteristic of eyeglasses in positions corresponding to pupils of eyes.

2. Description of Related Art

Generally, when manufacturing eyeglasses, a distance between optical centers of right and left lenses of eyeglasses and a distance between pupils of right and left eyes for a person wearing eyeglasses are set to be equal such that the centers of the pupils coincide with the optical centers of the lenses of eyeglasses for the person wearing the eyeglasses, respectively.

In this case, respective distances from the center of the nose of the person wearing the eyeglasses to the respective centers of pupils of the right and left eyes, namely, half pupillary distances are respectively measured. Accordingly, the right and left half pupillary distances conform to the half optical center distances from the center between the right and left eyeglass lenses to the optical centers of the right and left eyeglass lenses, respectively.

Conventionally, there has been known a lens-refracting characteristic measuring apparatus for measuring an optical center distance between light and left lenses of such eyeglasses (For example, reference to Japanese Patent Laid-Open H08-29292).

However, there may be a case that right and left half pupillary distances of actually manufactured eyeglasses do not agree with the right and left half optical center distances of the eyeglasses. When the centers of pupils for a person wearing eyeglasses do not accurately agree with the centers of the eyeglass lenses, respectively, the person wearing the eyeglasses has to wear the eyeglasses in a state in which prism occurs, in other words, a plurality of refractions are generated. In such eyeglasses, it was impossible to accurately measure the refracting characteristics of the eyeglass lenses in the positions corresponding to the centers of the pupils of the person wearing the eyeglasses.

On the other hand, there may be a case when a person wearing eyeglasses includes heterophoria and cross-eye, amount of prism is set in case of manufacturing the eyeglasses. The optical center distance of the eyeglasses manufactured by the amount of prism does not conform to the above mentioned pupillary distance. When the pupillary distance of such eyeglasses was measured, it was impossible to judge whether the amount of prism is set for the cross eye or not, or whether the half pupillary distances do not agree with the optical center distances or not.

Moreover, when the amount of prism was set for the cross-eye, it was hard to determine whether the amount of prism is appropriately set or not.

SUMMARY OF THE INVENTION

It is, therefore, an object of the present invention to provide a lens-refracting characteristic measuring apparatus capable of measuring refracting characteristics of eyeglass lenses preciously in the positions corresponding to the centers of pupils of a person wearing eyeglasses.

In order to achieve the above object, a lens-refracting characteristic measuring device in an aspect of the present invention comprises a measuring optical device to measure refracting characteristics of eyeglass lenses, an input device to input a pupillary distance of eyes of a person wearing eyeglasses, and an arithmetic and control circuit for obtaining refracting characteristics of the eyeglass lenses in positions of centers of right and left pupils of the person wearing the eyeglasses based on the pupillary distance of right and left eyes of the person wearing the eyeglasses input by the input device and the refracting characteristics measured by the measuring optical device.

In one embodiment, the measuring optical device comprises a projecting optical mechanism for projecting light to a lens and a light-receiving optical mechanism for receiving the light from the lens. The light-receiving optical mechanism includes, for example, a CCD for converting the light from the lens to an image signal. A measuring signal output from the CCD is input to the arithmetic and control circuit. On the other hand, a pupillary distance measuring device measures half pupillary distances from a center of a nose of a person wearing eyeglasses to the centers of right and left pupils, and then inputs the measured half pupillary distances into the arithmetic and control circuit. The arithmetic and control circuit obtains refracting characteristics in positions corresponding to the centers of right and left pupils of the eyeglass lenses based on the refracting characteristics measured by the measuring optical device and the half pupillary distances.

BRIEF DESCRIPTION OF THE DRAWINGS

FIG. 19A is a front view of the lens-refracting characteristic measuring apparatus when the eyeglasses are disposed in an eyeglass disposing space, and then are supported by frame supporting members.

FIG. 19B is a right side view of FIG. 19A.

FIG. 20A is a front view of the lens-refracting characteristic measuring apparatus when the eyeglass lenses in FIG. 19 are held down by lens holding members.

FIG. 20B is a right side view of FIG. 20A.

FIG. 21A is a front view of the lens-refracting characteristic measuring apparatus when the lens holding members in FIG. 20 are removed from the measuring optical path.

FIG. 21B is a right side view of FIG. 21A.

DETAILED DESCRIPTION OF THE PREFERRED EMBODIMENTS

Hereinafter, preferable embodiments according to the present invention will be described in details with reference to the accompanying drawings.

Figure 1:
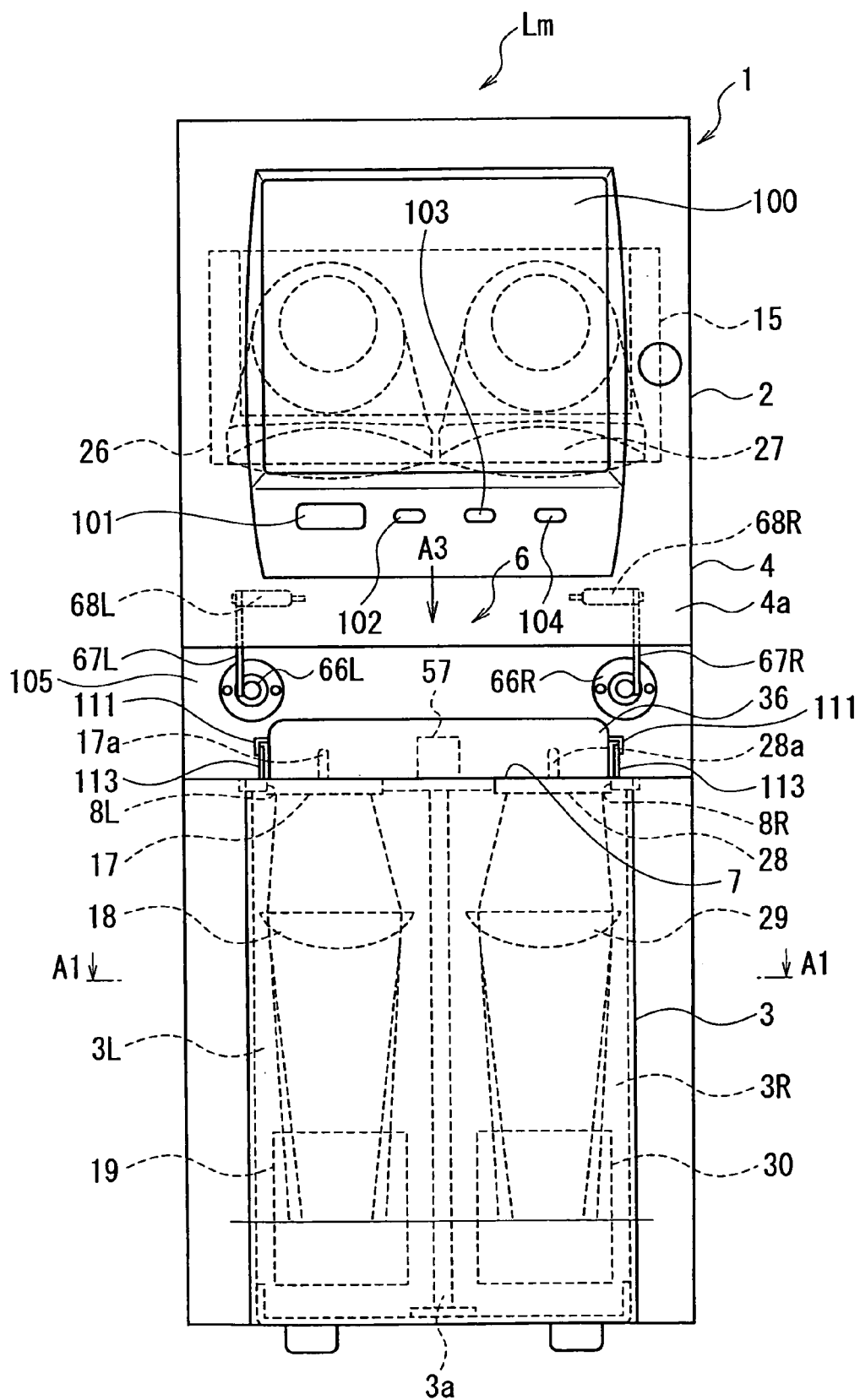
FIG. 1 is a front view of a lens-refracting characteristic measuring apparatus according to the present invention.
Figure 2:
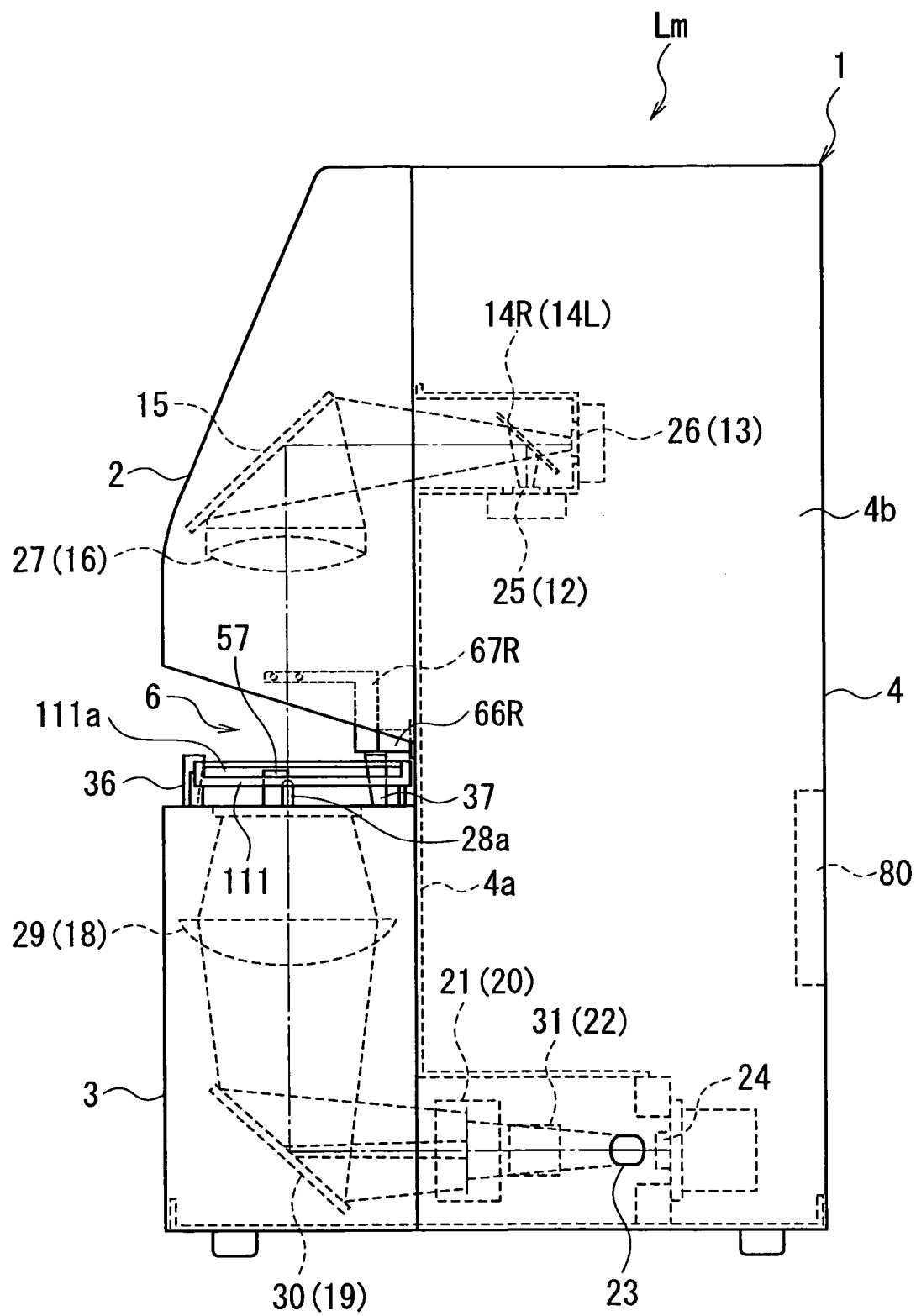
FIG. 2 is a right side view of the lens-refracting characteristic measuring apparatus in FIG. 1.
Figure 3:
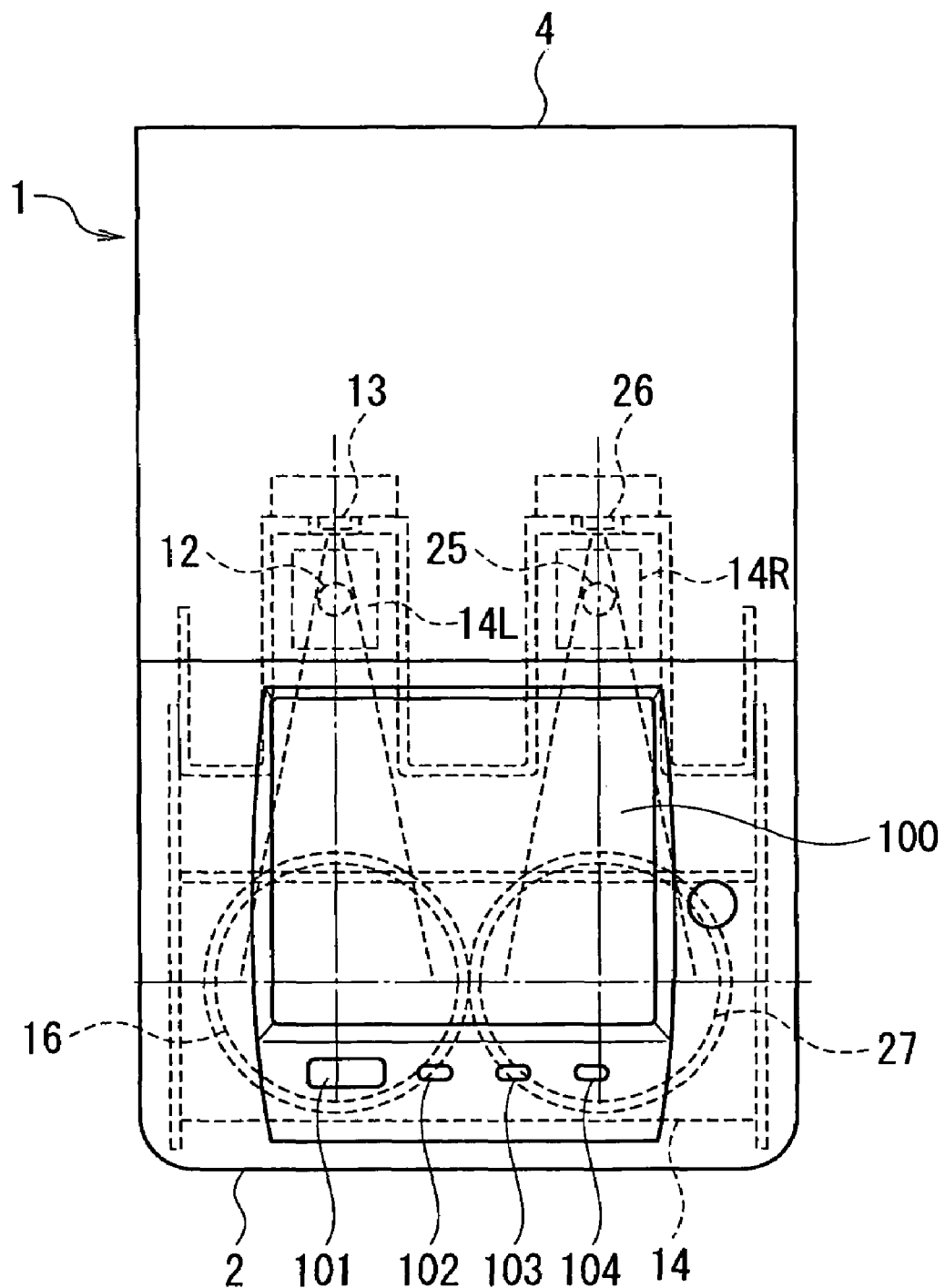
FIG. 3 is a plan view of the lens-refracting characteristic measuring apparatus in FIG. 1.
Figure 4:
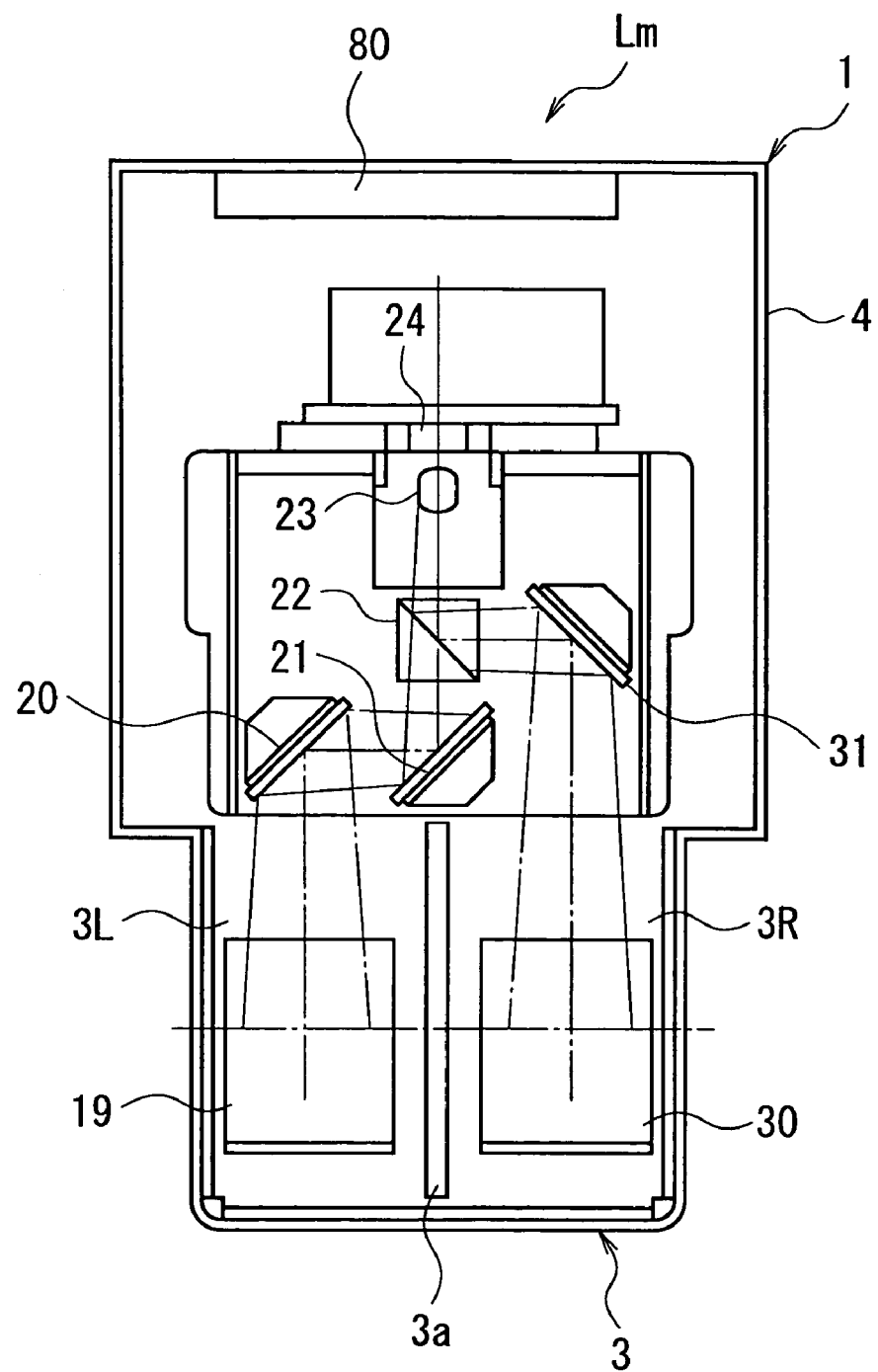
FIG. 4 is a cross-section view along A1-A1 line in FIG. 1.

FIGS. 1, 2 show an embodiment when the lens-refracting characteristic measuring apparatus according to the present invention is applied to measure lenses of eyeglasses. The lens-refracting characteristic measuring apparatus comprises a body case 1 and a measuring optical device accommodated in the body case 1.

Figure 5:
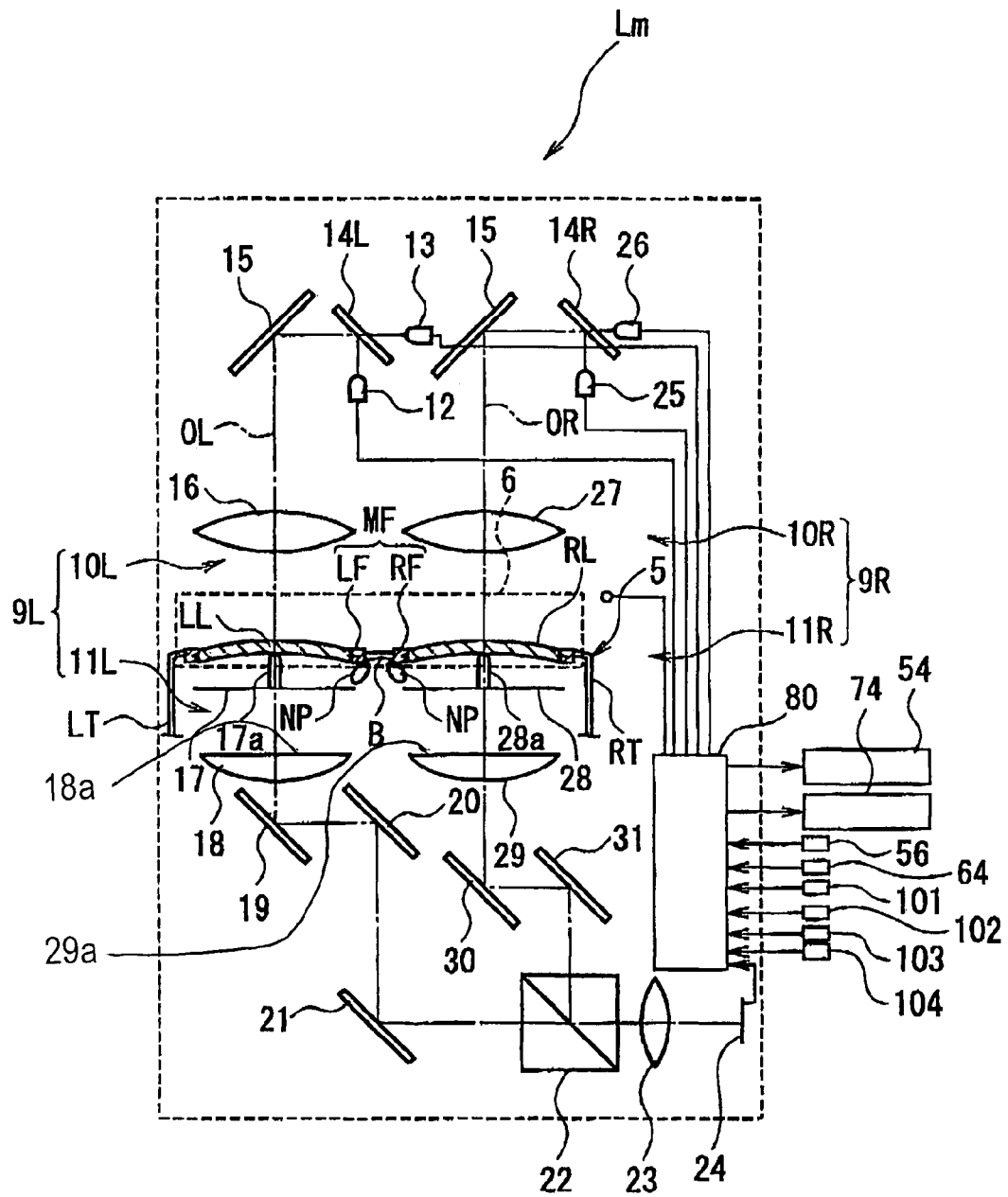
FIG. 5 is an explanation drawing of an optical system and a control circuit of the lens-refracting characteristic measuring apparatus shown in FIGS. 1 to 4.

The body case 1 includes an upper case portion 2, a lower case portion 3, and a coupling case portion 4 which couples the upper case portion 2 and the lower case portion 3. A set space 6 of eyeglasses 5 shown in FIG. 5 is formed between the upper case portion 2 and the lower case portion 3. In the coupling case portion 4, a back side of case body 4b is detachable from a side of front wall 4a.

In this embodiment, the eyeglasses 5 include an eyeglass frame MF, eyeglass lenses LL, RL framed in right and left lens frames LF, RF, a bridge B jointing the right and left lens frames LF, RF, nose pads NP provided in the right and left lens frames LF, RF, and temples LT, RT provided in the right and left lens frames.

The lower case body 3 has an upper wall 7, and openings 8L, 8R are formed in the right and left portions of the upper wall 7 (reference to FIG. 1). The inside of the lower case body 3 is divided into right and left spaces 3L, 3R by a party wall 3a.

The measuring optical device comprises a pair of measuring optical systems 9L, 9R on the right and left side, which are disposed in the body case 1 symmetrically.

The front surface, namely the front surface of the upper case body 2 is provided with a display device, for example, a liquid crystal indicator 100, and also a measuring switch 101, a mode switching switch 102, a data inputting switch 103, and a printing switch 104 are provided thereto.

An eyeglass disposing space 105 opening up to the front side and the right and left is formed between the upper case body 2 and the lower case body 3.

The left measuring optical system 9L includes a projecting optical mechanism 10L incorporated in the upper case body 2 and a light-receiving optical mechanism 11R incorporated in the lower case body 3.

The projecting optical mechanism 10L comprise a light source for projecting measuring luminous flux, for example, LED 12, 13, a dichroic mirror 14L, a reflection mirror 15, and a collimator lens 16. The LED 12 emits infrared light, and the LED 13 emits red light (wavelength of 630 nm). The dichroic mirror 14L reflects the infrared light from the LED 12, and the red light from the LED 13 penetrates the dichroic mirror 14L. The collimator lens 16 serves to convert the divergent luminous flux generated from the LED 12, 13 into parallel pencil as the measuring luminous flux. In the reflection mirror 15, the left side half from the central portion is used.

The light-receiving optical mechanism 11L comprises a Hartmann's pattern plate 17 disposed in the opening 8L, a field lens 18 having a screen 18a on the upper surface, reflection mirrors 19, 20, 21, a prism for synthesizing an optical path 22, an imaging lens 23, and a light-receiving element, for example, CCD 24. Many of light transmission portions (not shown) are disposed in the pattern plate 17 in a matrix shape.

The right measuring optical system 9R includes a projecting optical mechanism 10R incorporated in the upper case body 2, and a light-receiving optical mechanism 11R incorporated in the lower case body 3. The projecting optical mechanism 10R and the light-receiving optical mechanism 11R respectively have the same structure as the projecting optical mechanism 10L and the light-receiving optical mechanism 11L. Therefore, in summary, the projecting optical mechanism 10R includes LED 25, 26 as light sources for projecting measuring luminous flux, a dichroic mirror 14R, a reflection mirror 15, and a collimator lens 27. The light-receiving optical system 11R includes a Hartmann's pattern plate 28 disposed in the opening 8L, a field lens 29 having a screen 29a on the upper surface, reflection mirrors 30, 31, a prism for synthesizing an optical path 22, an imaging lens 23, and a CCD 24.

There is provided a lens supporting device. The lens supporting device has a lens supporting mechanism and a frame holding mechanism. In this embodiment, the lens supporting mechanism includes shaft-like lens supporting members 17a, 28b provided on the respective central portions of the pattern plates 17, 28. In the lens supporting members 17a, 28a, the top edge portions are formed in hemispheroid, and the axis lines are disposed to align with the optical axes OL, OR of the measuring optical systems 9L, 9R.

Figure 9:
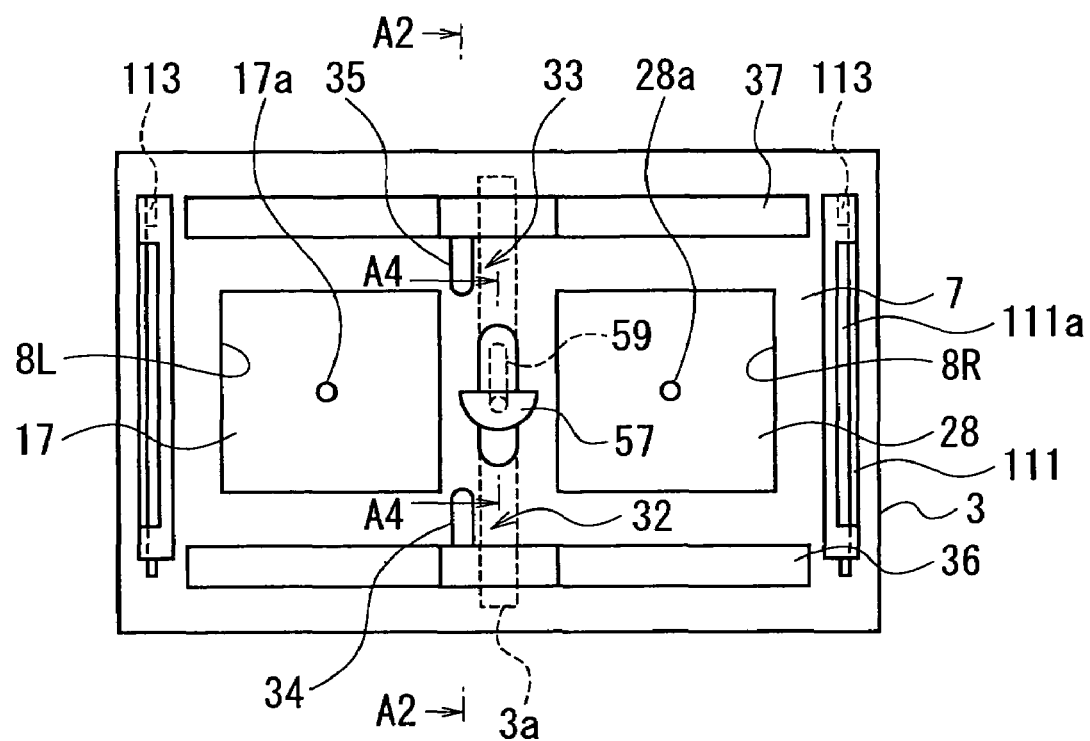
FIG. 9 is a plan view of the lens-refracting characteristic measuring apparatus in FIG. 1 seen from the arrow A3 direction.

The frame holding mechanism holds the eyeglass frame MF of the eyeglasses 5 when the lens supporting members 17a, 28a support the right and left lenses LL, RL of the eyeglasses 5. Moreover, horizontal midsections 32, 33 of the front edge portion and the back edge portion of the upper wall 7 are formed with slits 34, 35, respectively, extending back and forth along the party wall 3a, as shown in FIG. 9.

Figure 6:
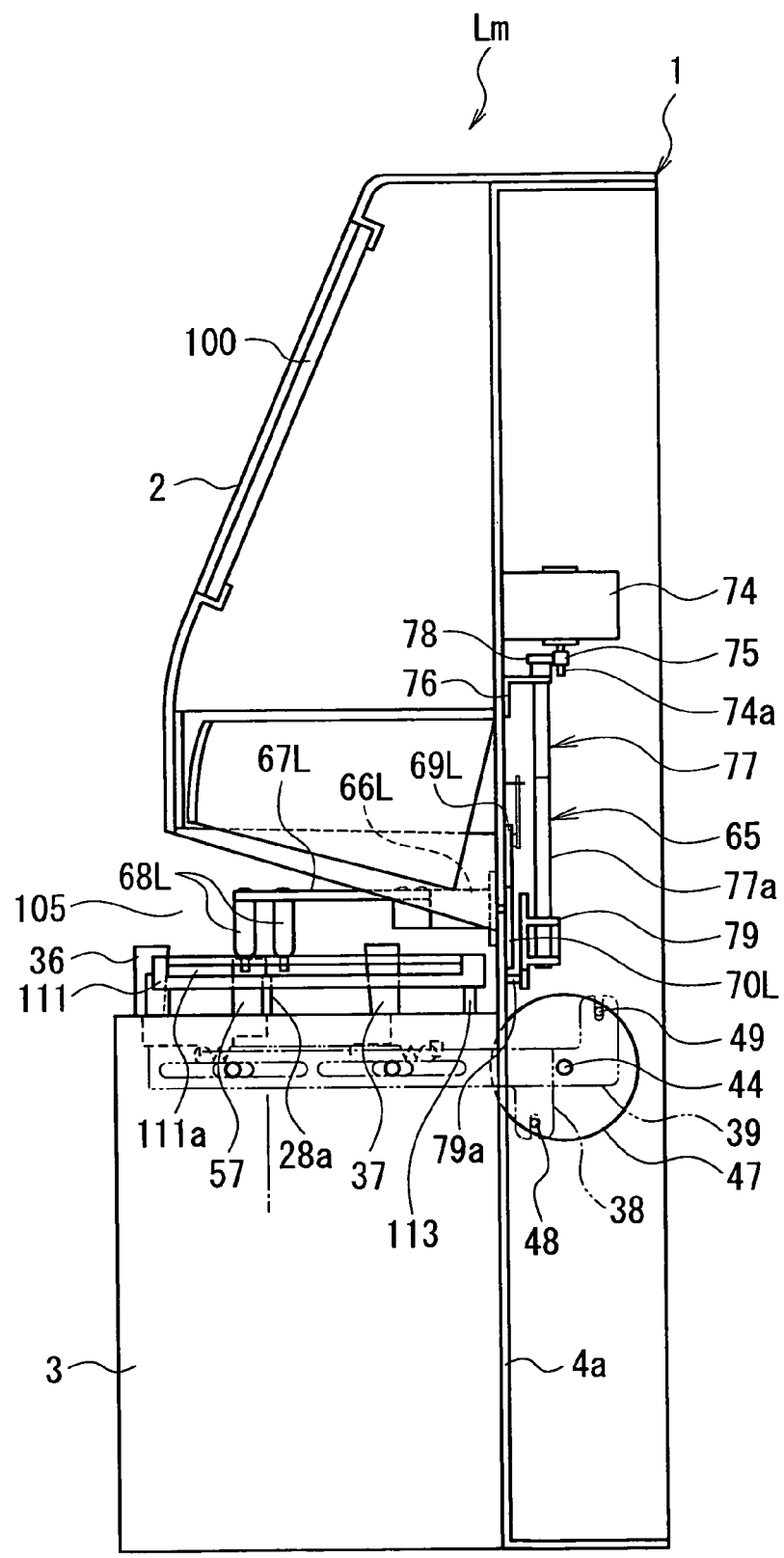
FIG. 6 is a partially sectioned side view of the lens-refracting characteristic measuring device, with a back side of the coupling case portion shown in FIGS. 2 to 4 removed.

The frame holding mechanism has a pair of platy frame holding plates 36, 37, extending from side to side and respectively disposed on the back edge portion and the front edge portion of the front side upper wall 7. Facing surfaces 36a, 37a of the frame holding plates 36, 37 are formed in inclined planes slightly inclined toward the lower side as illustrated in FIGS. 2, 6, 8.

Figure 8:
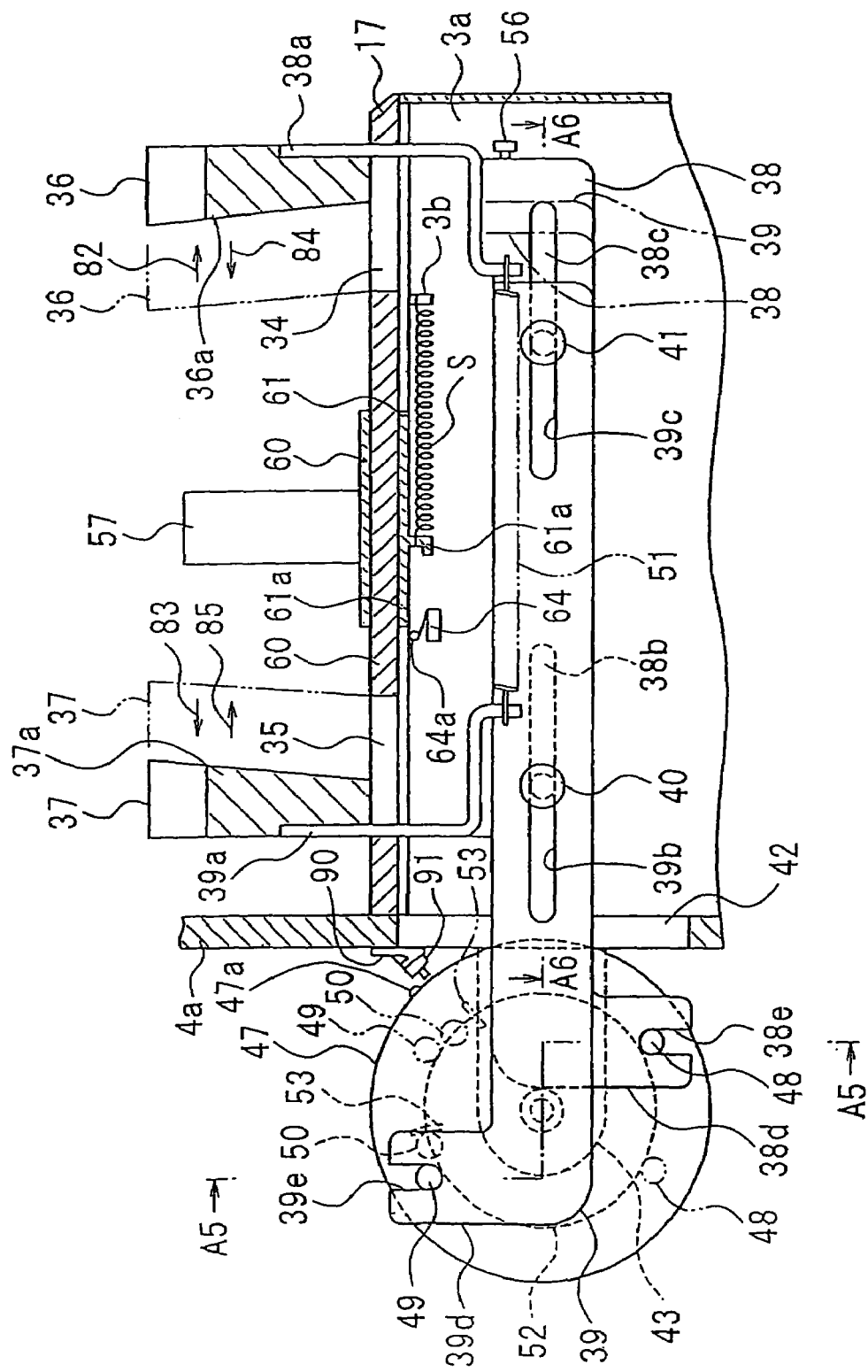
FIG. 8 is a cross-section view for explaining a flame supporting mechanism along A2-A2 line in FIG. 9.
Figure 11:
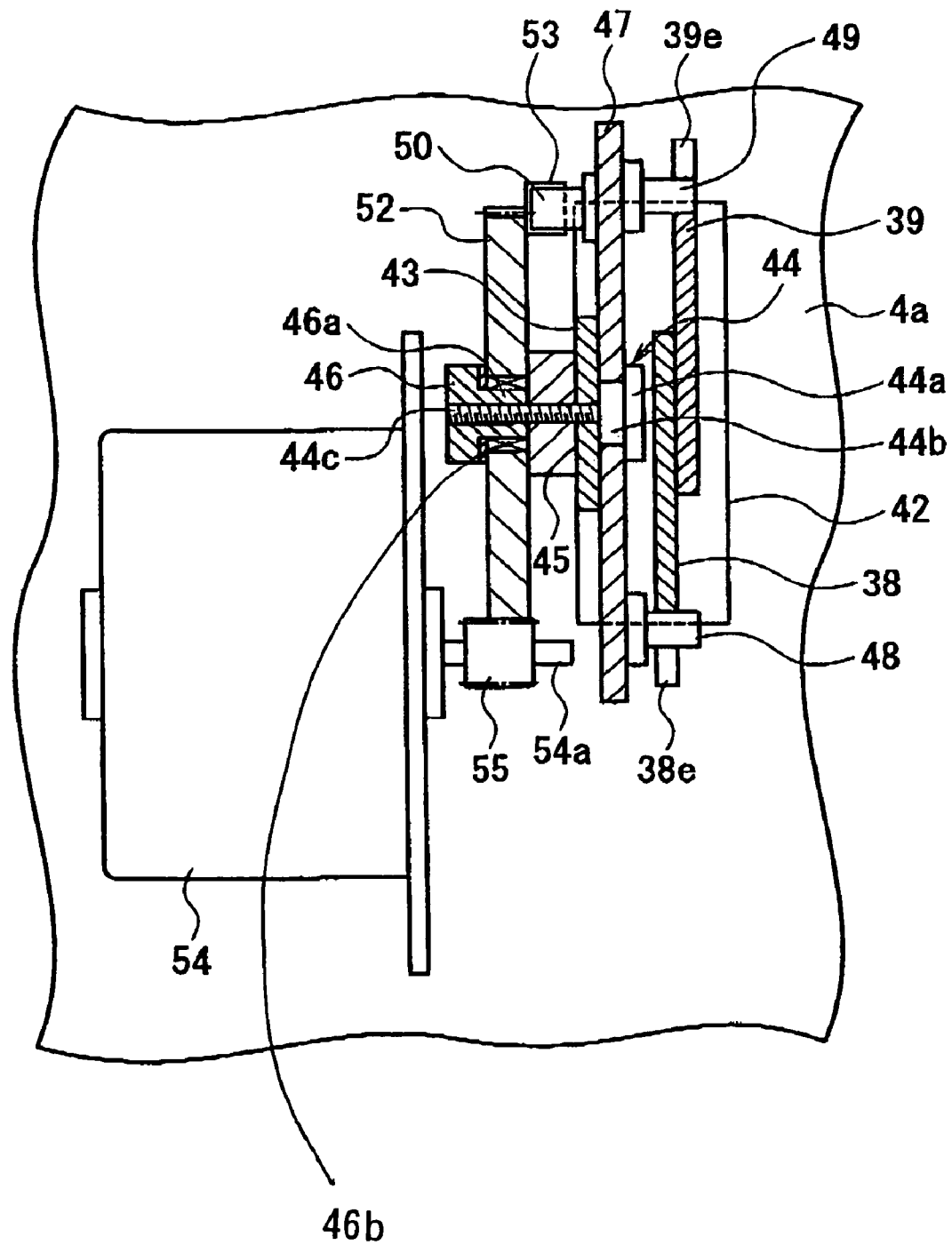
FIG. 11 is a cross-section view along A5-A5 line in FIG. 8.
Figure 12:
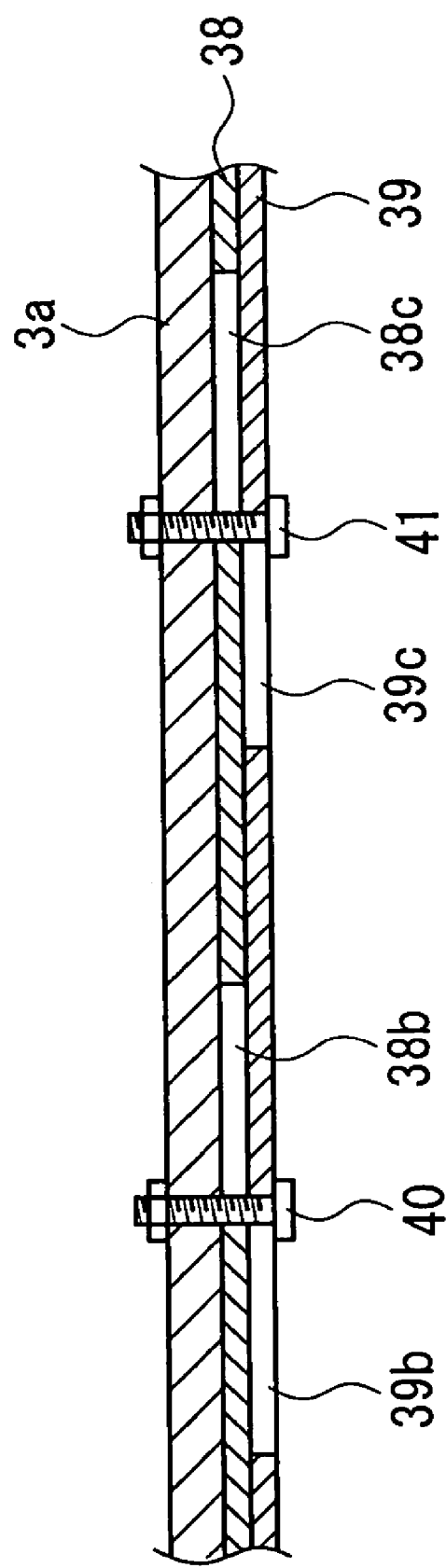
FIG. 12 is a cross-section view along A6-A6 line in FIG. 8.
Figure 13:
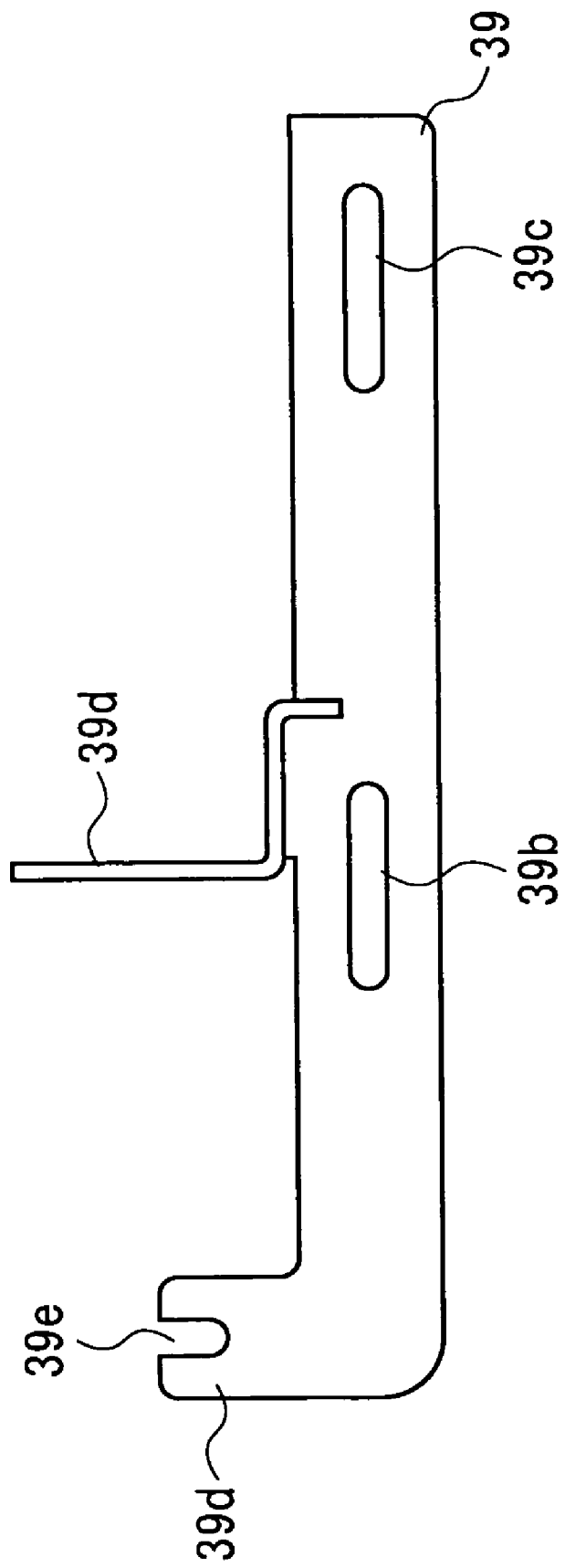
FIG. 13 is an explanation drawing of one of the link plates in FIGS. 8, 11, 12.

The frame holding mechanism also comprises a pair of link plates 38, 39 disposed in the lower case portion 3 (reference to FIGS. 8, 11, 12).

The link plates 38, 39 are disposed toward back and forth along the upper portion of the one side surface of the party wall 3a.

Figure 14:
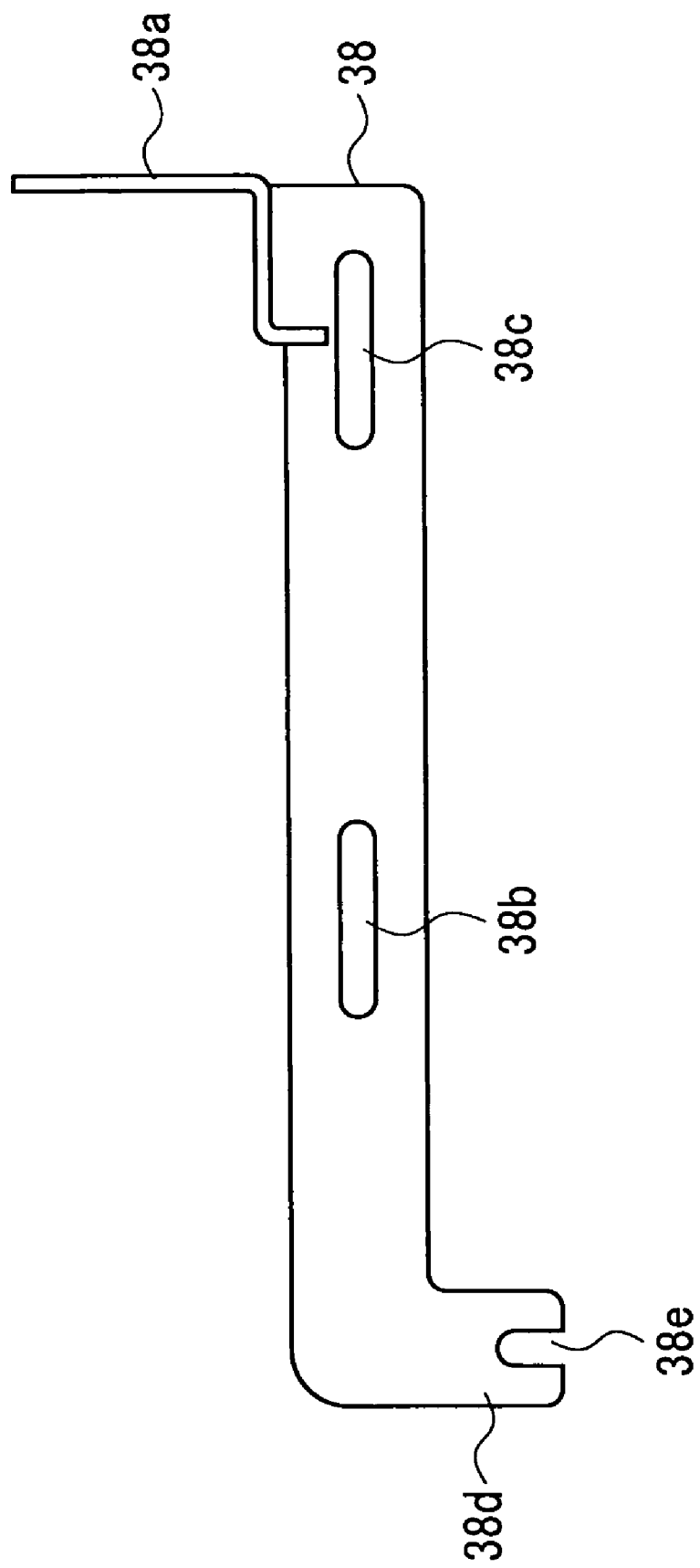
FIG. 14 is an explanation drawing of the other of the link plates in FIGS. 8, 11, 12.
Figure 15:
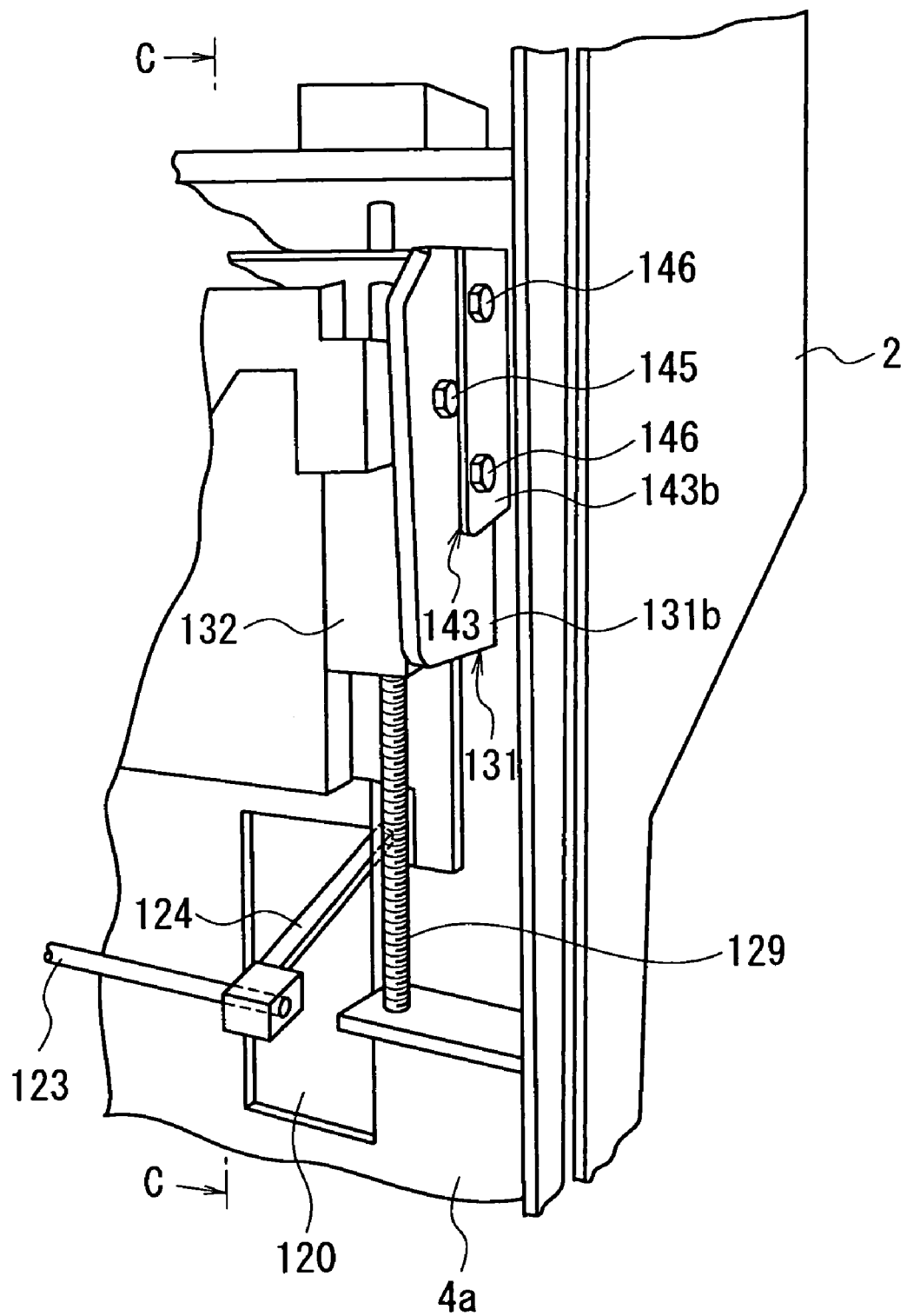
FIG. 15 is a part of perspective view for describing a feed screw for holding down a lever and a shielding cover.

The link plate 38 includes an upwardly projected mounting piece 38a on one end, as shown in FIGS. 8, 14, and slits 38b, 38c formed with an interval from side to side as illustrated in FIGS. 8, 12, 14, a downwardly projected engaging piece 38d on the other end, and an engaging notch 38e formed on the engaging piece 38d toward the lower side. The mounting piece 38a projects above the upper wall 7 through the slit 35, and is mounted on the frame holding plate 36.

The link plate 39 has an upwardly projected mounting piece 39a in the intermediate portion of the longitudinal direction, slits 39b, 39c formed in one end and the intermediate portion, an upwardly projected engaging piece 39d on the other end portion, and an engaging notch 39e formed on the engaging piece 39d toward the upper side.

The mounting piece 39a projects above the upper wall 7 via the slit 35, and is mounted on the frame holding plate 37.

A leading end portion of a guide screw 40 is engaged with a threaded hole provided in the party wall 3a after it passes through the slit 38b, 39b of the link plates 38, 39, respectively. Moreover, a leading end portion of guide screw 41 is engaged into with a threaded hole provided in the party wall 3a after it passes through the slits 38c, 39c of the link plates 38, 39, respectively. The guide screws 40, 41 joint the link plates 38, 39 to be relatively slidable in the longitudinal direction.

Figure 7:
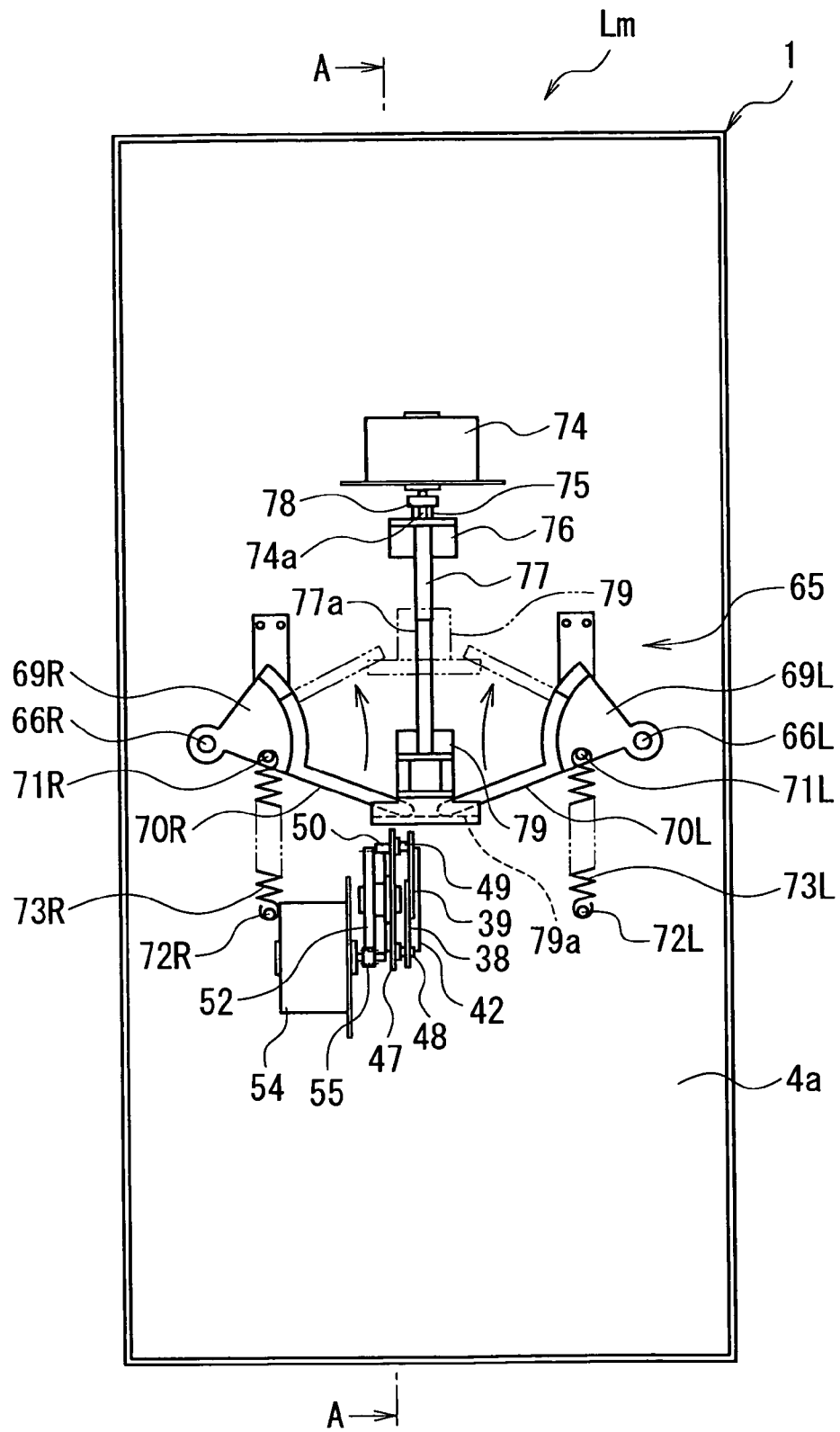
FIG. 7 is an explanation view of the front wall of the coupling case of the lens-refracting characteristic measuring apparatus in FIG. 6 when seen from the back surface side.

Furthermore, the frame holding mechanism includes an opening 42 formed in the front wall 4a of the coupling case body 4 corresponding to the upper portion of the lower case body 3 and the party wall 3a, a backwardly projected (inside the lower case body 3) supporting piece 43 on the lateral edge of the opening 42, and a supporting screw 44 mounted on the supporting piece 43, as shown in FIGS. 7, 8, 11.

The supporting screw 44 has a head portion 44a located in the opening 42 side, a large-diameter shaft portion 44b coupled to the head portion 44a, and a threaded portion 44c linked to the large-diameter shaft portion 44b. The supporting screw 44 is attached to the supporting piece 43 by engaging the threaded portion 44c with the supporting piece 43. The threaded portion 44c passes through the supporting piece 43 and projects to the side opposite to the side of the opening 42. A ring like spacer 45 is attached to the projected portion of the threaded portion 44c, and also a nut 46 is engaged therewith, as shown in FIG. 11. The nut 46 has a reduced diameter portion 46a on the spacer 45 side, and fixes the spacer 35 to the supporting piece.

The frame holding mechanism comprises a rotation plate (combination member) 47 rotatably mounted on the large-diameter shaft portion 44b, engaging pins 48, 49 attached to the portions of the link plates 38, 39 sides of the rotation plate 47 with 180° interval, and a an engaging pin 50 projected to the supporting piece 43 side. The engaging notches 38e, 39e of the link plates 38, 39 engage with the engaging pins 48, 49. A coil spring 51 is provided between the base portions of the mounting pieces 38a, 39a of the link plates 38, 39. The coil spring 51 biases the link plates 38, 39 in the direction that the frame holding plates 36, 37 come close each other.

A gear 52 is rotatably provided in the reduced diameter portion 46a through a bearing 46b. An engaging projection 53 engaging to the engaging pin 50 from the circumferential direction is integrally provided on the lateral surface of the gear 52. A driving mechanism 54 installed in the front wall 4a of the coupling case body 4 is disposed in the vicinity of the gear 52. A pulse motor can be used for the driving mechanism 54. A pinion 55 engaging with the gear 52 is attached to an output shaft 54a of the driving mechanism 54. The party wall 3a is provided with a limit switch 56 detecting a displacement stopping place of the link plate 38 when the interval between the frame holding plates 36, 37 becomes maximum.

The lens supporting device contains a nose pad supporting mechanism. The nose pad supporting mechanism is located on the upper wall 7, and includes a half-column shaped nose pad supporting member 57 located between the openings 8L, 8R and the frame holding plates 36, 37 as illustrated in FIG. 9. The nose pad supporting member 57 extends upwardly and downwardly, and also its planar shape is formed in the half-column shape. The lower edge of the nose pad supporting member 57 is provided with a supporting shaft 58.

Figure 10:
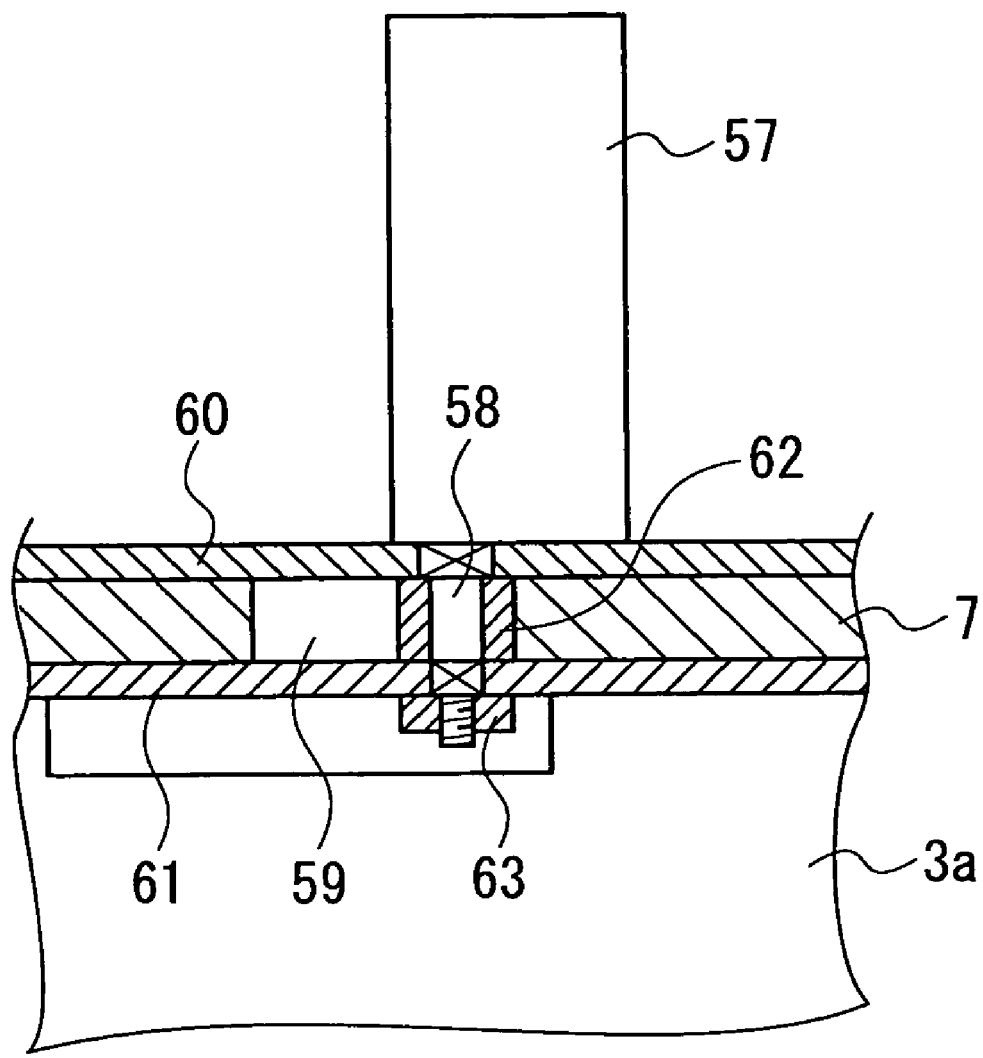
FIG. 10 is a cross-section view along A4-A4 line in FIG. 9.

As illustrated in FIGS. 9, 10, the upper wall 7 is formed with a slit 59 positioned between the openings 8L, 8R and extending backward and forward. The supporting shaft 58 provided in the lower edge of the nose pad supporting member 57 passes through the slit 59. Moreover, supporting plates 60, 61 extending along the slit 59 are disposed above and below the upper wall 7. The supporting shaft 58 penetrates the supporting plates 60, 61. A spacer tube 62 in which the supporting shaft 58 is fitted is provided between the supporting plates 60, 61, and a fixing nut 63 is engaged with the lower edge portion of the supporting shaft 58. The fixing nut 63 integrally fixes the supporting plates 60, 61 and spacer tube 62 to the nose pad supporting member 57.

The spacer tube 62 is arranged in the slit 59 to be movable in the longitudinal direction and not to move in the width direction. The spacer tube 62 is formed to be slightly longer than the thickness of the upper wall 7. The supporting plates 60, 61 are provided to be movable along the plate surfaces of the upper wall 7. In addition, the supporting shaft 58 and the supporting plates 60, 61 are adopted not to rotate relatively.

A coil spring S is provided between a projection for latching a spring 61a of the supporting plate 61 and a projecting for latching a spring 3b of the party wall 3a. The coil spring S biases the supporting plates 60, 61 and the nose pad supporting member 57 to the frame holding plate 36 side. A micro-switch 64 is attached to the party wall 3a as a displacement detecting device corresponding to a lateral edge portion 61a of the frame holding plate 37 of the supporting plate 61. The micro-switch 64 is adopted to detect the displacement operation of the nose pad supporting member 57 by turning on the actuator 64a with the pressure of the lateral end portion 61a of the supporting plate 61 when the nose pad supporting member 57 is displaced to the frame holding plate 37 side and then when the supporting plates 60, 61 are displaced to the frame holding plate 37 side.

As shown in FIGS. 1, 2, 6, 7, the front wall 4a of the coupling case body 4 is provided with a lens holding mechanism 65 as a lens holding device. The lens holding mechanism 65 includes rotatable rotating shafts 66L, 66R, which are located above the frame holding plate 37 and are respectively attached to the right and left lateral portions of the front wall 4a. The rotating shafts 66L, 66R project from the front wall 4a to the front side, and extend parallel and backward and forward each other.

The lens holding mechanism 65 includes L-shaped arms 67L, 67R fixed to the rotating shafts 66L, 66R, respectively, a pair of lens holding shafts 68L, mounted on the leading end portion of the arm 67L, and a pair of lens holding shafts 68R mounted on the leading end portion of the arm 67R.

As viewed the lens-refracting characteristic measuring apparatus 1 from the front, each of the two lens holding shafts 68L and each of the two lens holding shafts 68R are seen. However, a pair of the lens holding shafts 68R can be seen as viewed the lens-refracting characteristic measuring apparatus 1 from the right side. In this case, a pair of the lens holding shafts 68L is located in the positions overlapping with a pair of the lens holding shafts 68R. Accordingly, as a matter of explanation convenience, an explanation is given by mentioning the reference numeral of a pair of the lens holding shafts 68L to the portions of the reference numeral of a pair of the lens holding shafts 68R. The leading end portions of the les holding shafts 68L, 68R are formed in pin-shape.

The lens holding shafts 68L, 68R are disposed that the leading end portions of the lens holding shafts 68L, 68R face each other shown in FIG. 1, when the arms 67L 67R are stood shown in FIGS. 1, 2.

When the arm 67L (67R) is folded horizontally shown in FIG. 6, the lens holding shafts 68L, 68L (68R, 68R) are disposed on the both sides of the axis line of the lens supporting member 17a (28a) as a reference pin, i.e., the both side of the optical axis OL (OR).

As shown in FIGS. 6,7, the lens holding mechanism 65 comprises sector-shaped rotating plates 69L,69R fixed to the rotating shafts 66L, 66R, respectively in the coupling case body 4, narrow engaging pieces 70L, 70R coupling to the lower edge portions of the rotating plates 69L, 66R, spring latching portions 71L, 71R provided in the lower edge portions of the rotating plates 69L, 69R, spring latching portions 72L, 72R, which are located in the lower side of the spring latching portions 71L, 71R and project to the front wall 4a, a tension coil spring 73L provided between the spring latching portions 71L, 72L, and a tension coil spring 73R provided between the spring latching portions 71R, 72R.

The lens holding mechanism 65 includes a driving motor 74 such as a pulse motor installed in the upper potion of the front wall 4a in the coupling case body 4. In the driving motor 74, an output shaft 74a is directed up and down, and the output shaft 74a is disposed in the central portion of the right and left direction of the coupling case body 4. A pinion 75 is mounted on the output shaft 74a. An L-shaped bracket 76 is attached to the front wall 4a while locating in the lower side of the driving motor 74. An upper edge portion of a feed screw 77 extending up and down is held in the bracket 76 to be rotatable and non-movable in the up and down direction. Moreover, a tubular shaft supporting member (not shown) is fixed to the bracket 76 toward up and down, and the upper edge portion of the feed screw 77 is held in the shaft supporting member to be rotatable and non-movable in the up and down direction. In addition, a plurality of the shaft supporting members can be disposed up and down with intervals. The upper and lower edge portions of the feed screw 77 can be held by the shaft supporting member to be rotatable to the front wall 4a.

A gear 78 engaging with the pinion 75 is attached to the upper edge portion of the feed screw 77. The feed screw 77 is disposed in the central portion in the right and left direction of the coupling case body 4. An elevation member 79 is engaged with a threaded portion 77a of the lower portion of the feed screw 77. A flange 79a extending right and left in FIG. 7 projects toward the front wall 4a in the lower edge portion of the elevation member 79. The flange 79a abuts on the front wall 4a, and slidably moves up and down with respect to the front wall 4a by the elevation of the elevation member 79. The leading end portions of the engaging pieces 70L, 70R abut on the flange 79a, respectively, by the spring force of the tension coil springs 73L, 73R.

The lower case body 3 comprises the upper wall 7 as described above. Eyeglasses supporting mechanisms 110 are provided in the both sides of the lower case body 3.

The eyeglasses supporting mechanisms 110 comprise flame supporting members 111 disposed on the right and left sides of the upper wall 7 toward back and forth in a horizontal position, respectively, L-shaped brackets 112 attached to the front surfaces of the both sides of the font wall 4a of the coupling case body 4, respectively, and supporting shafts 113 passing through up and down the portions of the coupling case body 4 of the both sides of the upper wall 7 and the brackets 112, respectively.

The front shape of the frame supporting member 111 is formed in substantially L-shape. A slit 111a extending backward and forward is formed in the corner portion as shown in FIGS. 2, 9. The supporting shaft 113 is formed in rectangular column shape, and the edge portion of the frame supporting member 111 is mounted on the upper edge portion of the supporting shaft 113. Therefore, the supporting shaft 113 and the frame supporting member 111 do not rotate around the axis line of the supporting shaft 113.

Moreover, it is not always necessary for the supporting shaft 113 to be the rectangular column shape in order to obtain the structure that the supporting shaft 113 and the frame supporting member 111 do not rotate around the axis line of the supporting shaft 113. As the structure described above, another know structure can be used as long as the supporting shaft 113 and the frame supporting member 111 do not rotate around the axis lines.

A nut 114 as a stopper is engaged with the lower edge portion of the supporting shaft 113. Accordingly, the supporting shaft 113 and the frame supporting member 111 are installed in the body case 1 to move up and down within a predetermined region.

A flange 115 for receiving a spring is integrally formed in the intermediate portion of the supporting shaft 113. A biasing device, for example, a coil spring 116 is provided between the bracket 112 and the flange 115. The coil spring 116 biases the supporting shaft 13 upwardly.

The spring force of the coil spring 116 is set strong at some level in order to avoid dropping of the eyeglasses from the upper edges of the lens supporting members 17a, 28a to the lower portions by the own weight when eyeglasses are supported on the flame supporting members 111.

Lever-inserting openings 120 extending up and down corresponding to the right and left supporting shafts 113 are formed in the front wall 4a, respectively. A holding down mechanism for a frame supporting member 121 is attached to the front wall 4a.

Figure 17:
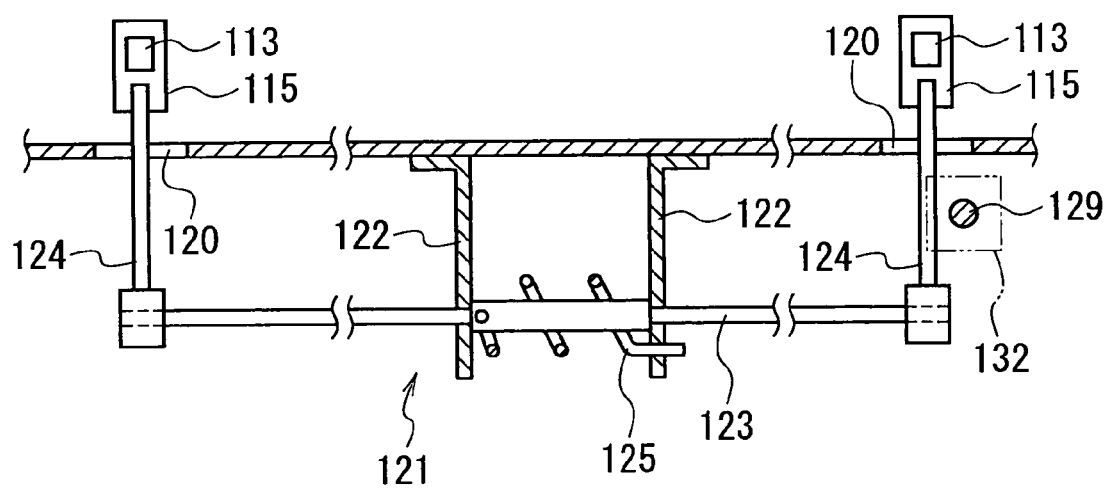
FIG. 17 is a cross-section view along B1-B1 line in FIG. 16.

As shown in FIG. 17, the holding down mechanism for a frame supporting member 121 comprises upper brackets 112, 112 which are fixed to the back surface of the front wall 4a while locating in the portions lower than the openings 120, a rotating shaft 123 which passes through the brackets 112, 112, and is held to be rotatable to the brackets 112, 112 and not to move in the axis line direction, holding down levers 124, 124 fixed to the both edge portions of the rotating shaft 123, and a coil spring 125, which is provided between the bracket 122 and the rotating shaft 123, and rotates and biases the holding down levers 124, 124 downwardly.

Each of the holding down levers 124 passes through the lever-inserting opening 120. The leading end portion of the holding down lever projects in the lower case body 3, and slightly abuts on the flange 115 of the supporting shaft 113 by the spring force of the coil spring 125.

Figure 16:
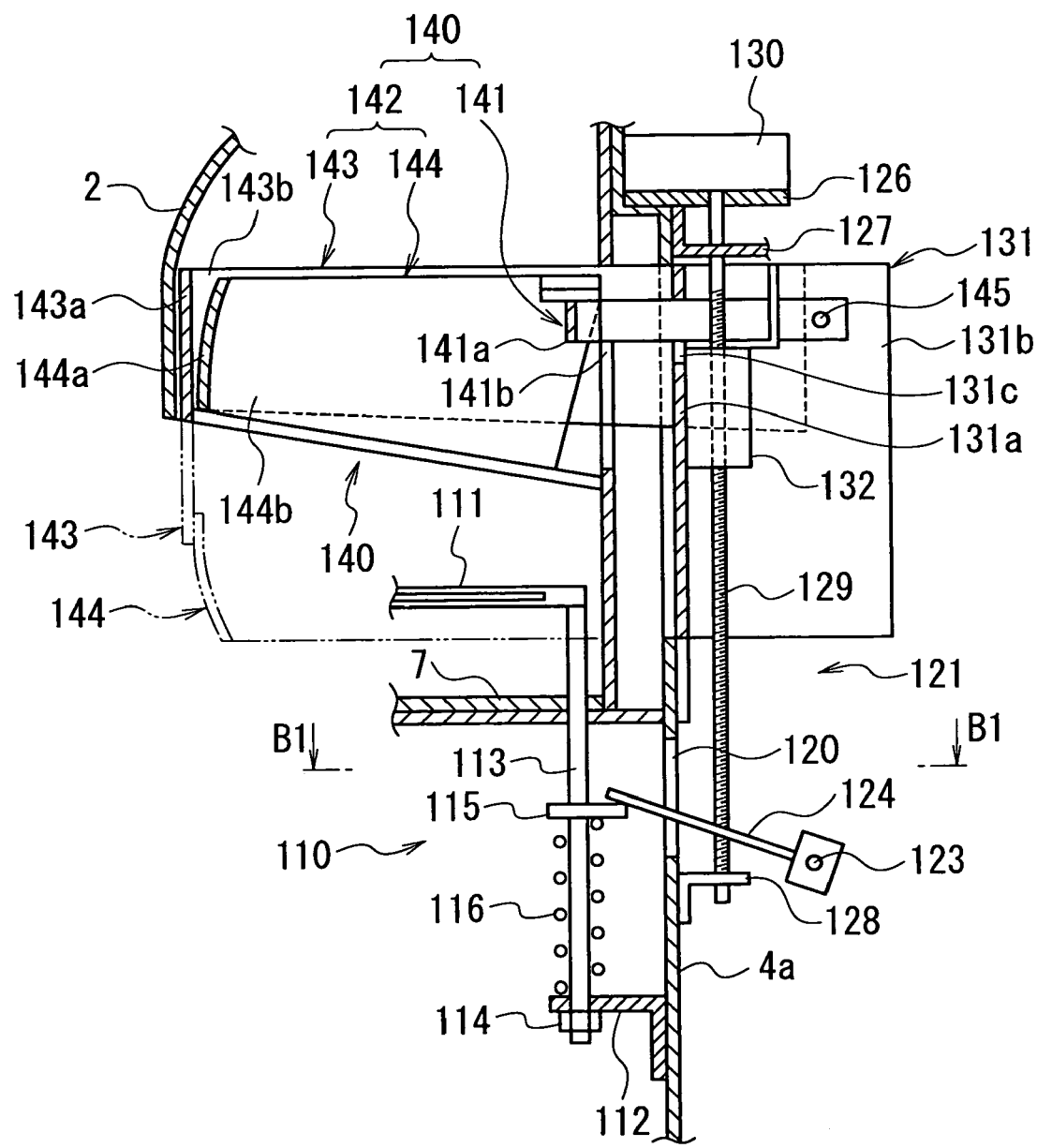
FIG. 16 is a cross-section view along C-C line in FIG. 15.

As shown in FIG. 16, the holding down mechanism 121 for a frame supporting member comprises upper brackets 126, 127 installed in the upper portion of the back surface of the front wall 4a, a lower bracket 128 mounted on the lower portion of the back surface of the front wall 4a, a feed screw 129 rotatably held in the brackets 126 to 128 while passing through the brackets 126 to 128, and a pulse motor 130, which is disposed on the bracket 126, and rotates and drives the feed screw 129. In addition, the lower bracket 128 is disposed lower than the opening 120.

The holding down mechanism for a frame supporting member 121 includes a slider 131 elevatably mounted on the back surface of the front wall 4a and a rectangular column shaped nut 132 engaging with the feed screw 129. The side face of the nut 132 abuts on the slider 131, and does not rotate around the axis line when rotating the feed screw 129. Therefore, the nut 132 moves upwardly and downwardly when rotating or reversely rotating the feed screw 129.

Figure 18A:
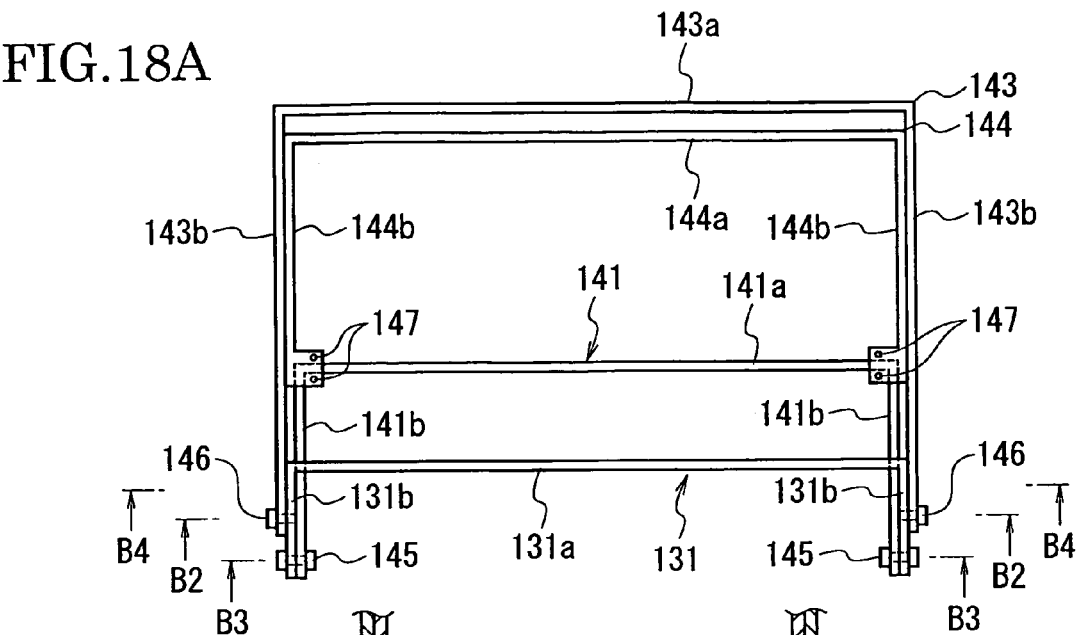
FIG. 18A is a plan view schematically illustrating the relationship between the shielding cover and the slider.
Figure 18B:
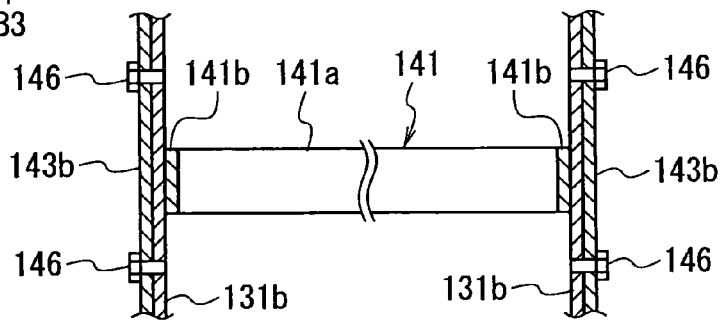
FIG. 18B is a cross-section view along B2-B2 line in FIG. 18A.
Figure 18C:
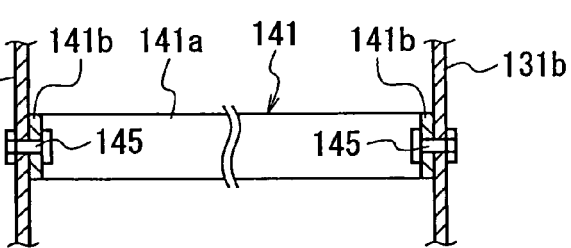
FIG. 18C is a cross-section view along B3-B3 line in FIG. 18A.
Figure 18D:
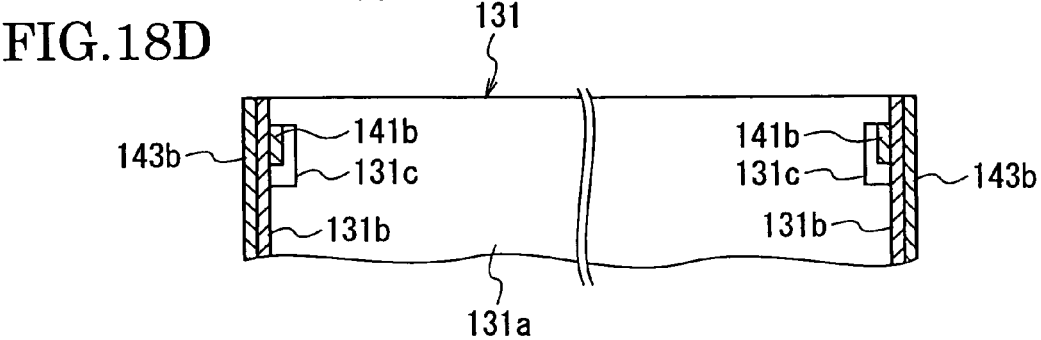
FIG. 18D is a cross-section view along B4-B4 line in FIG. 18A.

Moreover, as illustrated in FIGS. 16, 18A, the planar shape of the slider 131 is shaped in U-shape by a front plate portion 131a and side plate portions 131b, 131b coupled to the both sides of the front plate portion 131a. The both sides of the front plate portion 131a are formed with openings 131c, 131c as illustrated in FIG. 18D.

A part of the nut 132 is disposed to face one of the right and left holding down levers 124, 124 as shown in FIG. 16, and turns one of the holding down levers 124, 124 downwardly by falling.

The slider 131 is provided with a shielding mechanism 140 for covering the lateral of an eyeglasses disposing space 105 when measuring a lens-refracting characteristic of eyeglasses as illustrated in FIG. 16. The shielding mechanism 140 has the above described feed screw 129, pulse motor 130, slider 131, and nut 132.

As shown in FIG. 18A, the shielding mechanism 140 includes a turning arm 141 formed in U-shape by a front plate portion 141a and side plate portions 141b, 141b, and an elastic shielding cover 142. The shielding cover 142 includes an upper cover plate 143 formed in U-shape by a front cover plate portion 143a and side cover plate portions 143b, 143b and a lower cover plate 144 formed in U-shape by a front cover plate portion 144a and side cover plate portions 144b, 144b.

The side plate portions 141b, 141b of the turning arm 141 pass through the opening 131c, 131c provided in the front plate portion 131a of the slider 131 as shown in FIGS. 16, 18D. The lower edge portions of the side plate portions 141b, 141b are rotatably mounted on the side plate portions 131b, 131b of the slider 131 through the supporting shafts 145, 145.

One of the side plate portions 141b of the turning arm 141 is provided with the nut 132 from the lower portion. When the turning arm 141 is upwardly elevated by the nut 132 to be horizontal, the turning arm 141 abuts on the upper edge of the opening 131c, and does not turn any more. With this state, if the nut 132 is further elevated upwardly, the slider 131 is upwardly elevated integrally with the turning arm 141.

The side covering plate portions 143b, 143b of the upper cover plate 143 are fixed to the out side surfaces of the side plate members 131b, 131b through fixing screws 146, 146. The side covering plate portions 144b, 144b are fixed to the side plate portions 141b, 141b of the turning arm 141 through fixing screws 147, 147. The lower covering plate 144 is disposed to slightly contact with the inner side of the upper covering plate 143.

The output, i.e., a measuring signal of the above described element, i.e., CCD 24 is input to an arithmetic and control circuit 80 shown in FIG. 5, a limit switch 56 and a micro switch 64 are connected to the arithmetic and control circuit 80. The arithmetic and control circuit 80 controls the glowing of LED 12, 13, 25, 26, and controls the operation of the driving motors 54, 74.

The arithmetic and control circuit 80 is connected with an inputting device and the display device. The inputting device has a function for inputting the measuring results of the measuring optical device and a pupillary distance measuring device 220, and includes, for example, the measuring switch 101, the mode switching switch 102, the switch 103, and the printing switch 104. The display device is adopted to display the measuring result of the arithmetic and control circuit. However, if the measuring results of the measuring optical device and the pupillary distance measuring device 220 are displayed simultaneously, if is convenience for a person manufacturing eyeglasses since each of the measuring results can be see at sight. The display device comprises, for example, the liquid crystal indicator 100.

Figure 34:
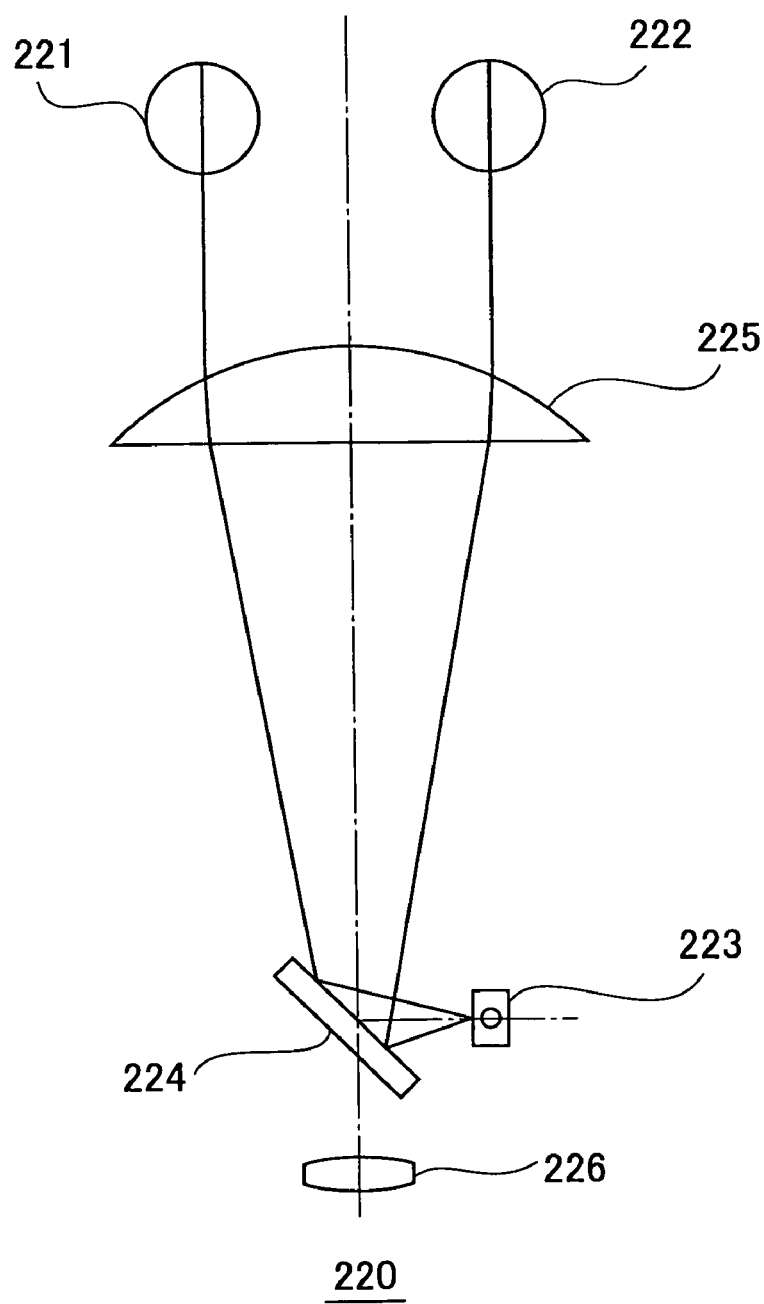
FIG. 34 is a view illustrating a principle of a pupillary distance measuring device.

The pupillary distance measuring device 220 includes a light source 223 for illuminating a target (not shown) toward eyes 221, 222 of a person wearing eyeglasses, a mirror 224, and an objective lens 225. The illumination light which illuminated the target is reflected by the mirror 224, and enters to the corneal surfaces of the eyes 221, 222 of the person wearing the eyeglasses through the objective lens 226. When an examiner sees the eyes 221, 222 of the person wearing the eyeglasses through an eyepiece 226, the examiner can observe a luminescent spot on the corneas of the eyes pf the person wearing the eyeglasses by the illumination light of the target, and measures the papillary distance of eyes of the person wearing the eyeglasses by an arithmetic circuit (not shown) based on the position of this luminescent spot (reference to FIG. 34).

Moreover, the pupillary distance measuring device 220 can be incorporated into the lens-refracting characteristic measuring apparatus according to the present invention.

Functions of the lens-refracting characteristic measuring apparatus having the above structures will be explained.

As shown in FIG. 8, before turning on the power source of the lens-refracting characteristic measuring apparatus, the engaging projection 53 of the gear 52 is positioned in the position shown by a chain double-dashed line. In this position, in order to reduce the tension of the coil spring 51, the frame holding plates 36, 37 are positioned in the positions illustrated by chain double-dashed lines by the tension of the coil spring 51, and the interval between the frame holding members 36, 37 are minimum, as shown in FIG. 8. In this position, the engaging pins 48, 49, 50 are positioned in the positions shown by chain double-dashed lines, and the engaging projection 53 slightly departs from the engaging pin 50 in the clockwise direction.

Before turning on the power supply of the lens-refracting characteristic measuring apparatus, in order to reduce the tension of the coil springs 73L, 73R, the elevation member 79 is positioned in the lower edge portion of the threaded portion 77a of the feed screw 77 as illustrated in FIG. 7 by a solid line. In this position, the engaging pieces 70L, 70R of the rotating plates 69L, 69R are inclined downwardly by the tension of the coil springs 73L, 73R as illustrated by solid lines, and the arms 67L, 67R are horizontally folded.

If the power source of the lens-refracting characteristic measuring apparatus is turned on from the above described states, the arithmetic and control circuit 80 detects the shift of the nose pad supporting member 57, and then rotates the pinion 55 by driving and controlling the driving motor 54. The gear 52 rotates in the counter-clockwise direction in FIG. 8 by the rotation of the pinion 55. Along this rotation, after the engaging projection 53 projected to the gear 52 abuts on the engaging pin 50, the engaging projection 53 rotates the rotating plate 47 in the counter-clockwise direction by moving the engaging pin 50 in the counter-clockwise direction in FIG. 8.

Along the rotation of this rotating plate 47, the engaging pins 48, 49 shifts together with the rotating plate 47 from the positions illustrated by the chain double-dashed lines in the counter-clockwise direction. Accordingly, the link plates 38, 39 shift in the opposite direction each other against the tension of the coil spring 51.

In other words, in FIG. 8, the link plate 38 shifts to the right side from a position (not shown) to a position shown by a solid line, and the link plate 39 shifts to the left side from a position (not shown) to a position shown by a solid line. If the link plate 38 shifts to the position shown by the solid line in FIG. 8, the limit switch 56 is turned on by the edge portion of the link plate 38, and this ON signal is input to the arithmetic and control circuit 80.

When the ON signal is input from the limit switch 56, the arithmetic and control circuit 80 stops the driving of the driving motor 54.

By the relative displacement of the link plates 38, 39, the frame holding plates 36, 37 shifts to the directions shown by the arrows 82, 83 (opposite direction each other) from positions shown by chain double-dashed lines to positions shown by solid lines. Accordingly, the interval between the frame holding plates 36, 37 becomes maximum to be the standby state of the measuring operation.

On the other hand, when the power source of the lens-refracting characteristic measuring apparatus is turned on, the arithmetic and control circuit 80 rotates the pinion 75 by driving the driving motor 74 shown in FIGS. 6, 7, and then displaces the elevation member 79 to the upper edge portion of the threaded portion 77a of the feed screw 77 illustrated by a chain double-dashed line in FIG. 7 by transmitting the rotation of the pinion 75 to the feed screw 77 via the gear 78. Therefore, before starting a measurement, the engaging pieces 70L, 70R of the rotating plates 69L, 69R are inclined upwardly shown in chain double-dashed lines, and the arms 67L, 67R stand shown in FIGS. 1, 2, and the leading end portions of the lens holding shafts 68L, 68R faces each other. Consequently, the standby state of the measuring operation is obtained.

Figure 26:
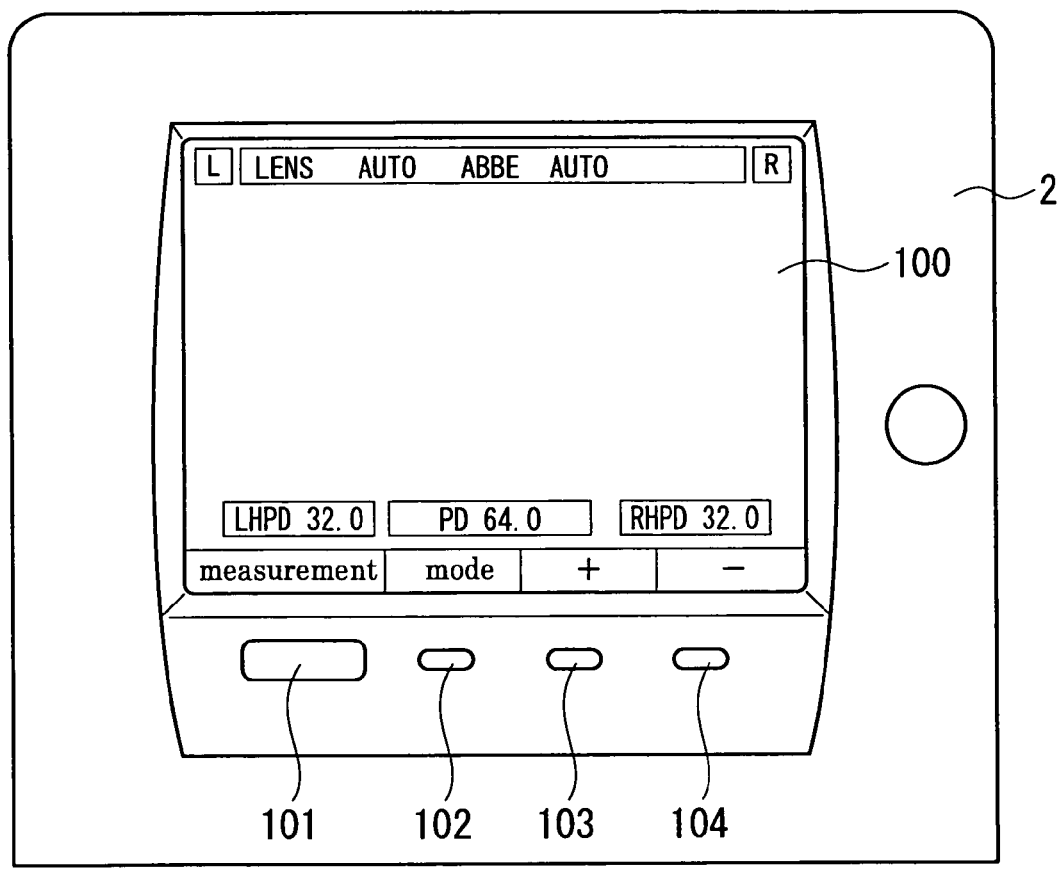
FIG. 26 is an explanation drawing of a screen for inputting half pupillary distances of a person wearing eyeglasses.

With this measuring operation standby state, an inputting screen of pupillary distance shown in FIG. 26 is displayed on the liquid crystal indicator 100 by the arithmetic and control circuit 80.

Standard data of a left half LHPD from the center of a nose of a person wearing eyeglasses to the center of the left pupil, a pupillary distance PD, and a right half RHPD from the center of the nose of the person wearing eyeglasses to the center of the right pupil are sequentially displayed in the lower portion of the liquid crystal indicator 100. In other words, the liquid crystal indicator 100 displays that LHPD 32, PD 64, and RHPD 32.

Displays such as measurement, mode, +, and − corresponding to the measuring switch 101, the mode switching switch 102, the switch 103, and the printing switch 104 are displayed on the lower edge portion (lower end portion) of the liquid crystal indicator 100.

In this state, the input modes of LHPD and RHPD can be switched by operating the mode switching switch 102. This switching state can be informed to an operator by changing colors of the portions of LHPD and RHPD shown in FIG. 28.

Figure 27:
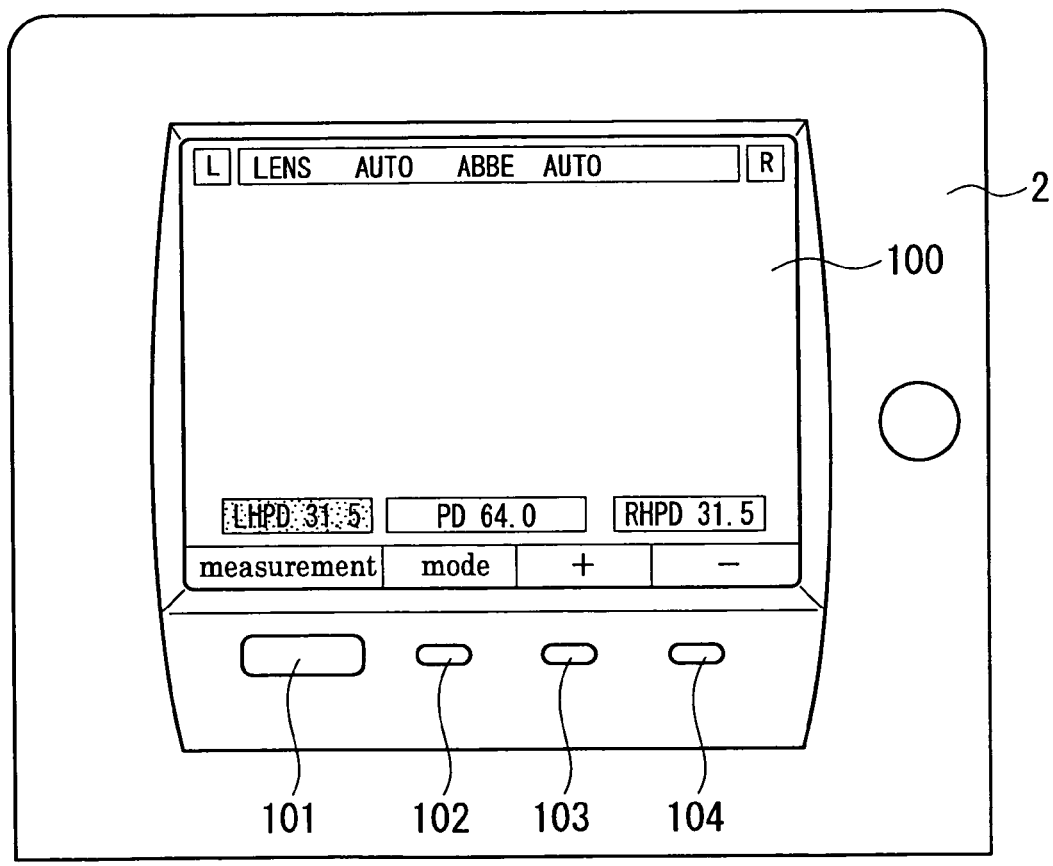
FIG. 27 is an explanation drawing of a screen for inputting half pupillary distances of a person wearing eyeglasses.
Figure 28:
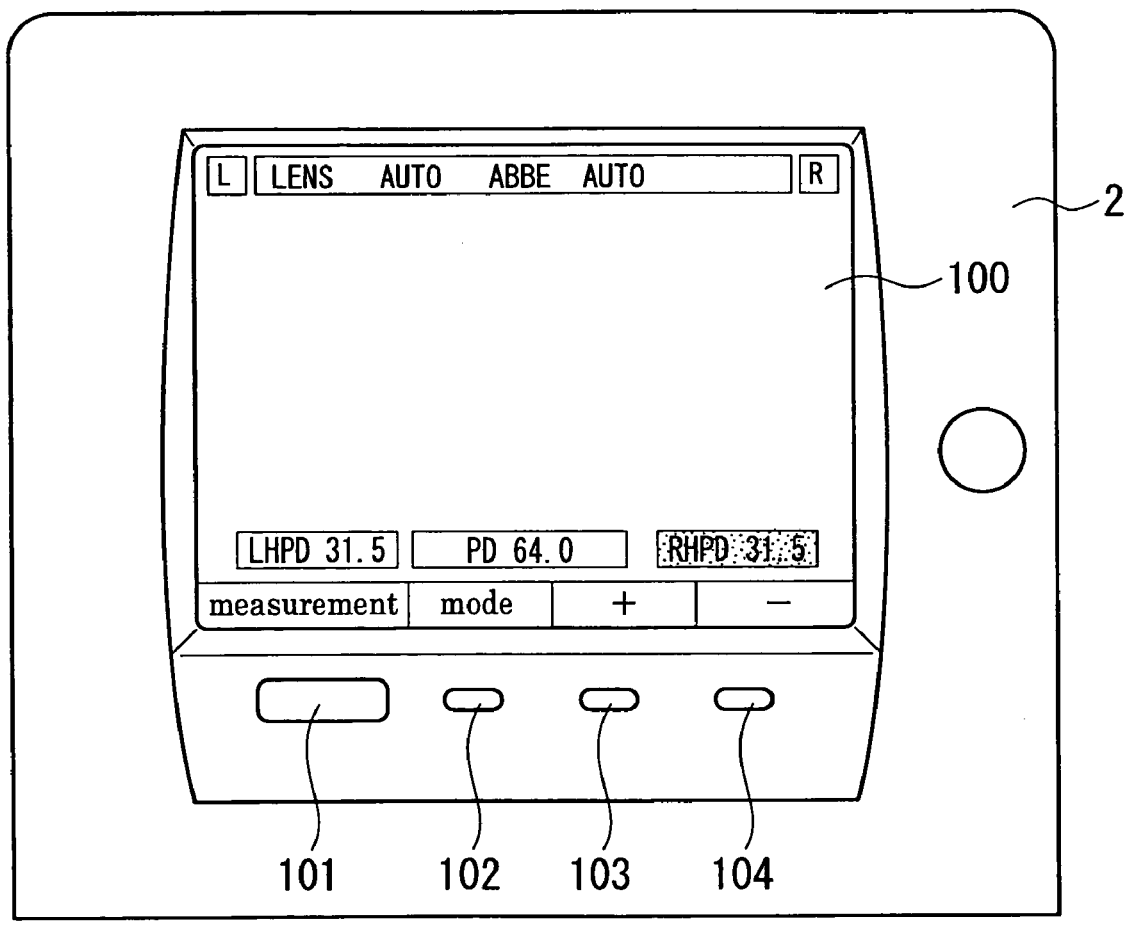
FIG. 28 is an explanation drawing of a screen for inputting half pupillary distances of a person wearing eyeglasses.

In the state shown in FIG. 27, the LHPD data can be changed, and in the state shown in FIG. 28, the RHPD data can be changed.

Accordingly, in FIG. 27, the LHPD data, 32 can be increased and decreased by operating the switches 103, 104. In FIG. 28, the RHPD data, 32 can also be increased and decreased by operating the switches 103, 104. The LHPD and RHPD set by the above are based on a prescription value of a person wearing eyeglasses measured by a refractometer and a PD meter. Here, an example, for example, LHPD is changed to 31.5, and RHPD is changed to 31.5 is explained.

Moreover, in this embodiment, the LHPD and RHPD are set by inputting with hands, however the setting of LHPD and RHPD are not limited thereto.

For example, LHPD and RHPD data of a person wearing eyeglasses can be input to the portions of LHPD and RHPD by sending the LHPD and RHPD data measured by a refractometer or PD meter to the arithmetic and control circuit 80 by connecting the refractometer or PD meter to the arithmetic and control circuit 80.

In such a state, when measuring a refracting characteristic such as the refracting characteristic of the eyeglasses 5 by the lens-refracting characteristic measuring apparatus, the eyeglass frame MF of the eyeglasses 5 is disposed in the eyeglasses disposing space 105, and the nose pads NP, NP of the eyeglasses 5 bring into contact with the front surface of the upper edge portion of the nose pad supporting member 57.

Figure 22A:
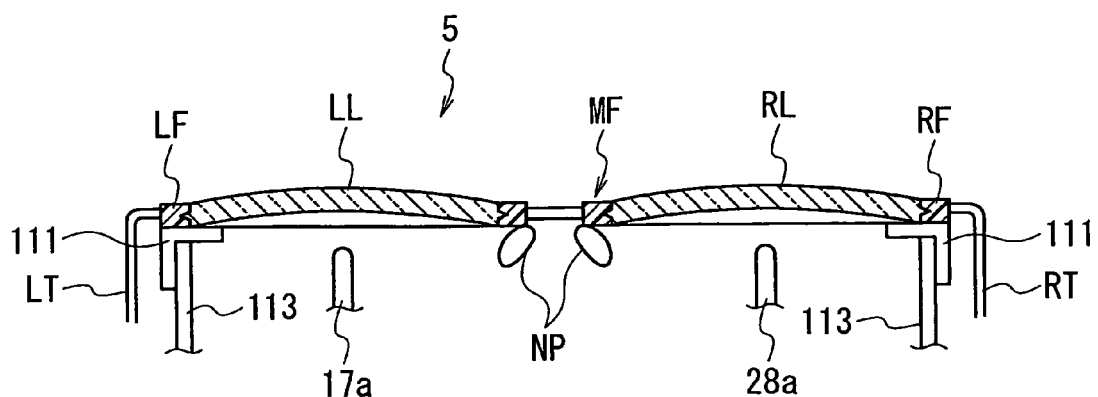
FIG. 22A is a view for describing the function of the frame supporting members.

At the same time, the portions of the temples LT, RT mounting portion sides of the right and left lens frames LF, RF of the eyeglass frame MF are supported on the frame supporting members 111, 111 as illustrated in FIGS. 19, 22A. In this case, since the right and left lens frames LF, RF of the eyeglass frame MF are respectively supported by two points, the right and left lens frames LF, RF are supported to be substantially horizontal without inclining up and down in the anteroposterior direction, even when the bycentric positions do not exist in the centers for the shapes of the lens frames LF, RL and the mounting positions of the temples LT, RT. Furthermore, the lens frames LF, RF and eyeglass lenses LL, RL are disposed above the upper edges of the lens supporting members 17a, 28a by the spring force of the coil spring 116.

Accordingly, the eyeglass lenses LL, RL are disposed in the optical paths of the measuring optical systems 9L, 9R, respectively. In other words, the eyeglass lens LL is disposed between the projecting optical mechanism 10L and light-receiving optical mechanism 11L of the measuring optical system 9L, and the eyeglass lens RL is disposed between the projecting optical mechanism 10R and the light-receiving optical mechanism 11R of the measuring optical system 9R.

Moreover, when the eyeglass frame has a rimless frame, i.e., a two point frame, temple mounting members are mounted on the edge portions of the eyeglass lenses by fixing screws. However, the portions on which the fixing screws are mounted can not be supported by the frame supports 111, 111 because the fixing screws are projected. Consequently, the slits 111a, 111a are provided along the corner portions of the L-shaped frame supports 111, 111, and the fixing screws can be disposed from the slits 111a, 111a to the outsides, so that the eyeglasses with small rimless frames can be measured.

When the measuring switch 101 is pressed, the arithmetic and control circuit 80 rotates the pinion 55 for a predetermined rotation number by driving and controlling the driving motor 54 with a predetermined driving pulse. The gear 52 rotates in the clockwise direction in FIG. 8 by the rotation of the pinion 55. The engaging projection 53 projected on the side surface of the gear 52 moves in the clockwise direction by the rotation of the gear 52. The driving and controlling of the driving motor 54 by the arithmetic and control circuit 80 is performed till the engaging projection 53 shifts to the position shown by the chain double-dashed line. In addition, the driving motor 54 can be stopped by detecting this position with the micro-switch and the limit switch.

Along this, the engaging pin 50 of the rotating plate 47 shifts in the clockwise direction in FIG. 8 followed by the engaging projection 53 with the spring force of the coil spring 51, and the rotating plate 47 rotates integrally with the engaging pin 50 in the clockwise direction.

Along the rotation of this rotating plate 47, the engaging pins 48, 48 shift in the clockwise direction from the positions illustrated by the solid lines together with the rotating plate 47, and the link plates 38, 39 shift in the opposite direction each other by the tension (spring force) of the coil spring 51.

In this case, the link plate 38 shifts to the left side in FIG. 8, and the frame holding plate 36 integrated to the link plate 38 shifts to the left side illustrated by the arrow 84 in FIG. 8. The link plate 39 shifts to the right side, and the frame holding plate 37 integrated to the link plate 39 shifts to the right side shown by the arrow 85 in FIG. 8.

Therefore, the lens frames LF, RF and the lenses LL, RL of the eyeglass frame MF displace to the central side between the frame holding plates 36, 37 by displacing the frame holding plates 36, 37 in the direction coming close each other with an equal amount shown by the arrows 84, 85.

In this case, the nose pad supporting member 57 moves back and forth along the slit 59 together with the nose pads NP of the eyeglass frame MF, and the eyeglass frame MF moves in the right and left direction by the circular surface of the nose pad supporting member 57 such that the nose pads NP are placed between the pattern plates 17, 28. Accordingly, the supporting position of the eyeglass frame MF is corrected to the right position.

Figure 23A:
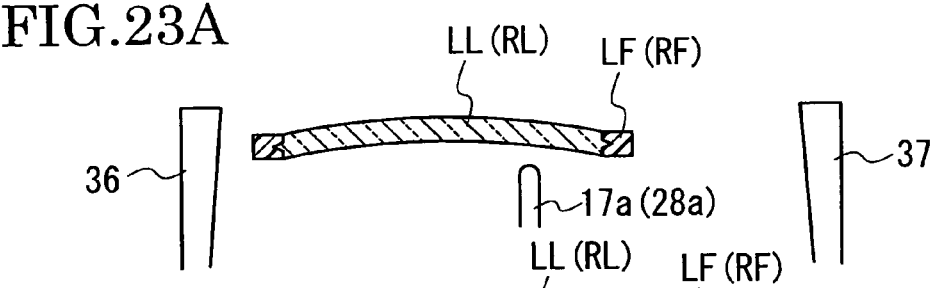
FIG. 23A is a view for describing the function of the frame holding members and the lens holding members.
Figure 23B:
FIG. 23B is a view for describing the function of the frame holding members and the lens holding members.

Therefore, as shown in FIG. 23A, if the eyeglass lenses LL, RL are disposed disproportionately with respect to the frame holding plates 36, 37, the lens frames LF, RF and eyeglass lenses LL, RL shift to the central side between the frame holding plates 36, 37 as shown in FIG. 23B by the movement of the frame holding plates 36, 37.

In this case, the right and left lens frames LF, RF and the eyeglass lenses LL, RL are in the states which are floated above the upper edges of the lens supporting members 17a, 28a as shown in FIGS. 19, 23A, 23B, so that the lens frames LF, RF do not have contact with the lens supporting members 17a, 28a from the sides. As a result, when the disproportionately disposed lens frames LF, RF displace to the central side between the frame holding plates 36, 37 by the frame holding plates 36, 37, the lens supporting members, 17a, 28a are not damaged by the lens frames LF, RF.

By such a displacement, the eyeglass frame MF of the eyeglasses 5 are held to be sandwiched between the inclined facing surfaces 36a, 37a, and the substantially central portions of the right and left eyeglass lenses LL, RL are disposed in the states which are floated above the lens supporting members 17a, 28a.

Next, the arithmetic and control circuit 80 rotates the feed screw 129 by driving and controlling the pulse motor 130, and the nut 132 falls by the rotation of the feed screw 129. The turning arm 141 falls by the own weights of the slider 131, turning arm 141, shielding cover 142, and the like, followed by the nut 132, so that the slider 131, turning arm 141, shielding cover 142, and the like fall integrally.

With this fall, as shown in FIG. 16 by the chain double-dashed line, if the upper covering plate 143 of the shielding cover 142 projects downwardly from the upper case body 2 for a predetermined amount, the lower edge of the slider 131 abuts on the lower bracket 128, and then the fall of the slider 131 is stopped.

The nut 132 further falls from this position, and the turning arm 141 turns downwardly about the supporting shafts 145, 145 till the turning arm 141 abuts on the lower edge of the opening 131c. Accordingly, the lower covering plate 144 projects downwardly from the upper covering plate 143 as shown by a chain double-dashed line in FIG. 16. In addition, if the fall of the nut 132 is performed till the turning arm 141 abuts on the lower edge of the opening 131c, the driving of the pulse motor 130 is stopped.

Therefore, the front side and the right and left side portions of the eyeglass disposing space 105 are covered by the shielding cover 142 (the covering plates 143, 144). As described above, after displacing the eyeglasses 5 to the center of the anteroposterior direction, the front side and the right and left side portions of the eyeglass displacing space 105 are covered by the shielding cover 142.

Moreover, the lower edge portion side of the eyeglasses disposing space 105 has a portion, which is not covered by the shielding cover. However, the outside light obliquely entered from the upper portion side of the eyeglass disposing space 105 is shielded by the shielding cover 142, so that it does not affect the measuring. In addition, the lower edge portion side of the eyeglass disposing space 105 includes the portion which is not covered slightly; however, the entire space of the eyeglass disposing space 105 including the above portion can be shielded.

Following the above shielding operation, the arithmetic and control circuit 80 rotates the pinion 75 by driving and controlling the driving motor 74 with the predetermined number of driving pulses, and the arithmetic and control circuit 80 transmits this rotation to the feed screw 77 via the gear 78. By this feed screw 77, the elevation member 79 moves from the position shown by the chain double-dashed line to the lower side. At this time, the driving of the driving motor 74 is performed till the elevation member 79 reaches to the lower edge portion of the feed screw 77. When the elevation member 79 reaches to the lower edge portion of the feed screw 77, the driving of the driving motor 74 is stopped. Moreover, such an operation can be carried out by rotating the driving motor 74 of the pulse motor for a predetermined rotation number. However, the driving of the driving motor 74 can be stopped by a detecting signal obtained by detecting an up and down displacement position of the elevation member 79 with a position detecting device such as a micro-switch.

In accordance with the downward displacement of the elevation member 79, the leading end portions of the engaging pieces 70L, 70R of the rotating plates 69L, 69R displace downwardly followed by the flange 79a of the elevation member 79. The rotating plate 69L rotates in the counter-clockwise direction in FIG. 7 by the spring force of the coil spring 73L, and the rotating plate 69R rotates in the clockwise direction in FIG. 7 by the spring force of the coil spring 73R.

Figure 22B:
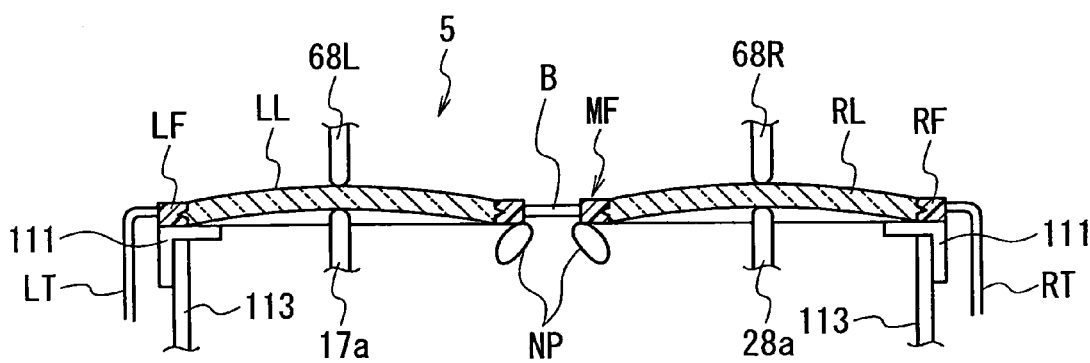
FIG. 22B is a view for describing the function of the frame supporting members.
Figure 23C:
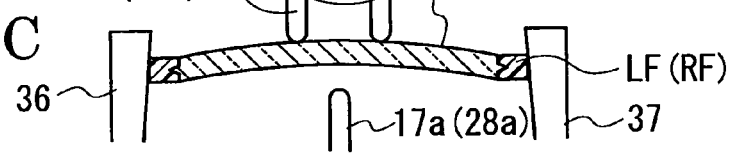
FIG. 23C is a view for describing the function of the frame holding members and the lens holding members.
Figure 23D:
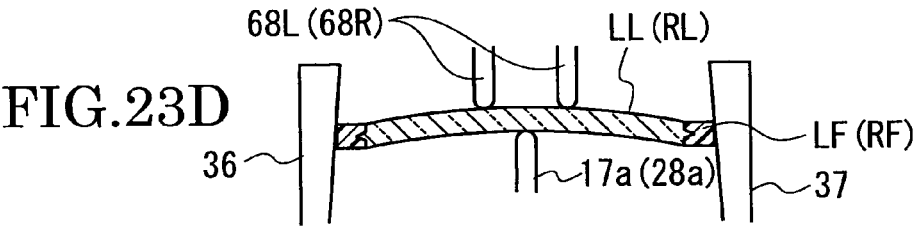
FIG. 23D is a view for describing the function of the frame holding members and the lens holding members.

The rotation of such rotating plates 69L, 69R are transmitted to the arms 67L, 67R via the rotation shafts 66L, 66R. Therefore, the arm 67L and the lens holding shaft 68L are displaced in the clockwise direction shown by the arrow 86 in FIG. 19A, and the arm 67R, and the lens holding shaft 68R are displaced in the counter-clockwise direction shown by the arrow 87 in FIG. 19A. The lens holding shafts 68L, 68L and 68R, 68R fall while rotating as described above. After abutting on the eyeglass lenses LL, RL as illustrated in FIG. 23C, the lens holding shafts 68L, 68L and 68R, 68R further fall, and then the leading end portions of the lens holding shafts 68L, 68L and 68R, 68R press the light and left lenses LL, RL of the eyeglasses 5 with respect to the lens supporting members 17a, 28a, as shown in FIGS. 20, 22B, 23D.

The pressing of the eyeglass lenses LL, RL by the lens holding shaft 68L, 68L and 68R, 68R is performed only by the spring force of the coil springs 73L, 73L.

On the other hand, the frame supporting member 111 falls together with the eyeglass lenses LL, RL against the spring force of the coil spring 116 by the pressing of the eyeglass lenses LL, RL with the lens holding shafts 68L, 68L and 68R, 68R.

Figure 23E:
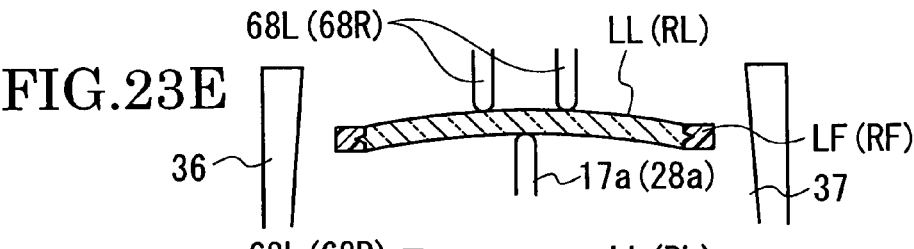
FIG. 23E is a view for describing the function of the frame holding members and the lens holding members.

With this state, the arithmetic and control circuit 80 rotates the pinion 55 in the direction opposite to the above described direction for a predetermined rotation number by driving and controlling the driving motor 54 with a predetermined number of driving pulses. The gear 52 rotates in the counter-clockwise direction in FIG. 8 by the rotation of the pinion 55, and then the engaging projection 53 projected on the side surface of the gear 52 moves in the counter-clockwise direction. Accordingly, the frame holding plates 36, 37 move in the direction departing from the lens frames LF, RF as shown in FIG. 23E by the rotation of the gear 52.

Therefore, even though the eyeglass lenses LL, RL are held (are sandwiched) between the frame holding plates 36, 37 in a state inclined backward and forward in the lens-refracting characteristic measuring apparatus, the two lens holding shafts (lens holding members) 68L, 68L and 68R, 68R press the both sides of the axis line (alignment with the optical axis OL) of the lens supporting member 17a and the axis line (alignment with the optical axis OR) of the lens supporting member 28a by the spring force of the coils spring 73L, 73L, so that the inclination of the eyeglass lenses LL, RL are corrected by the spring force of the coil springs 73L, 73R and the two lens holding shafts (lens holding members) 68L, 68L and 68R, 68R when the frame holding plates 36, 37 depart from the lens frames LF, RF.

Figure 23F:
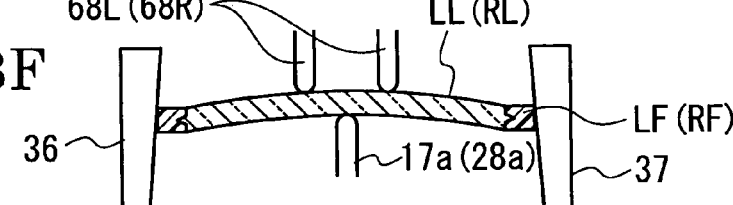
FIG. 23F is a view for describing the function of the frame holding members and the lens holding members.
Figure 23G:
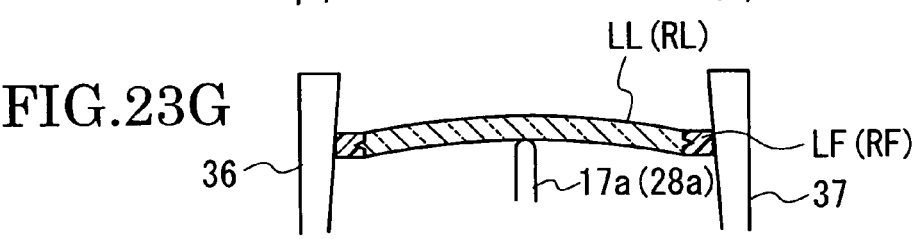
FIG. 23G is a view for describing the function of the frame holding members and the lens holding members.

Next, the arithmetic and control circuit 80 rotates the pinion 55 by driving and controlling the driving motor 54 with a predetermined number of driving pulses for a predetermined rotation number. The gear 52 rotates in the clockwise direction in FIG. 8 by the rotation of this pinion 55, and then the engaging portion 53 projected to the side surface of the gear 52 moves in the clockwise direction by the rotation of the gear 52. Accordingly, the frame holding plates 36, 37 moves to the lens frame LF, RF sides. Therefore, since the frame holding plates 36, 37 sandwiches the lens frames LF, RF again as shown in FIG. 23F, the eyeglass frame MF having the lens frames LF, RF is accurately held between the inclined facing surfaces 36a, 37a of the frame holding plates 36, 37.

After this, the arithmetic and control circuit 80 rotates the feed screw 129 by driving and controlling the pulse motor 130. The nut 132 further falls for a predetermined amount and stops, and the nut 132 turns one of the right and left holding down levers 124, 124 for a predetermined amount by pressing one of the right and left holding down levers 124, 124 downwardly. In this case, the rotation shaft 123 rotates together with one of the pressing down levers 124 in the same direction, and the other pressing down lever 124 rotates in the lower side.

Figure 22C:
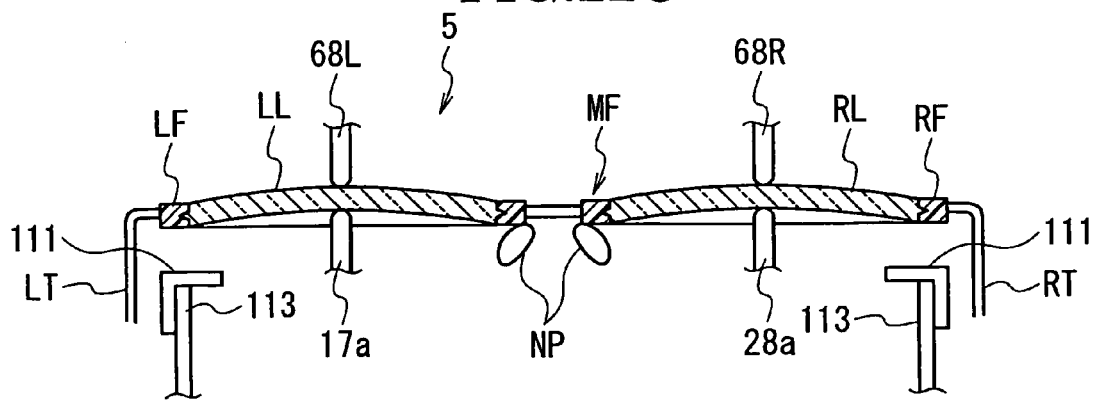
FIG. 22C is a view for describing the function of the frame supporting members.

Therefore, as shown in FIG. 22C, the right and left supporting shafts 113 and frame supporting members 111 are integrally pressed down by the pressing down levers 124 against the spring force of the coil spring 116, and then the frame supporting members 111 depart from the lens frames LF, RF of the eyeglass frame MF.

As a result, the spring force of the coil spring 116 does not act on the lens frames LF, RF through the supporting shaft 113 and the frame supporting member 111. With this state, even if the lens holding shafts 68L, 68R depart from the eyeglass lenses LF, RF, by the spring force of the coil spring 116, the lens supporting members 17a, 28a do not float from the eyeglass lenses LF, RF.

After this, the arithmetic and control circuit 80 raises the elevation member 79 by driving and controlling the driving motor 74 with a predetermined number of driving pulses contrary to the above. The leading end portions of the engaging pieces 70L, 70R upward by the elevation member 79. Accordingly, the rotating plates 69L, 69R rotate in the direction opposite to the above against the spring force of the coil springs 73L, 73L, and the arms 67L, 67R are turned perpendicularly to the positions directing upward shown by the arrows 86', 87' in FIG. 2.

With this position, the lens holding shafts 68L, 68R mounted to the arms 67L, 67R are displaced right and left from the Hartman's plates 17, 28 illustrated in FIGS. 21, 22G, so that the lens holding shafts 68L, 68R do not shield the measuring luminous flux.

With this state, the arithmetic and control circuit 80 measures the eyeglass lens LL by illuminating the LED 12, 13 of the measuring optical system 9L in order. Here, after the measuring luminous flux from the LED 12 is reflected by the dichroic mirror 14L and the total reflection mirror 15, the measuring luminous flux is projected onto the eyeglass lens LL by being converted into the parallel pencil with the collimator lens 16. In accordance with this, the measuring luminous flux penetrating the eyeglass lens LL becomes a lot of measuring luminous flux by penetrating the pattern plate 17, and then this luminous flux is projected onto the top surface of the field lens 18. The luminous flux projected onto the top surface of the field lens 18 is guided to the CCD 24 via the field lens 16, reflection mirrors 19, 20, 21 the prism for synthesizing an optical path 22, and imaging lens 23. In this case, the pattern image of the pattern plate 17 is imaged on the CCD 24 by the imaging lens 23.

After the measuring luminous flux from the LED 13 is reflected by the total reflection mirror 15 by penetrating the dichroic mirror 14L, the measuring luminous flux is projected onto the eyeglass lens LL by being converted into the parallel pencil with the collimator lens 16. In accordance with this, the measuring luminous flux penetrating the eyeglass lens LL becomes a lot of measuring luminous flux by penetrating the pattern plate 17, and then this measuring luminous flux is projected onto the top surface of the field lens 18.

The arithmetic and control circuit 80 measures of the refracting characteristics of each portion of eyeglass lens from the pattern image imaged onto the CCD 24. Accordingly the arithmetic and control circuit 80 obtains the mapping data of the refracting characteristics of each portion of the eyeglass lens LL. The refracting characteristics include spherical diopter power (S), cylindrical degree (C), cylindrical axis angle (A), and the like.

In this case, the refracting characteristics of the left eyeglass lens LL are obtained by corresponding to the position of the left half pupillary distance LHPD 31.5. The refracting characteristics are obtained in the position for distance when the eyeglass lens LL is a progressive refracting lens.

With this state, the arithmetic and control circuit 80 measures the eyeglass lens RL by illuminating the LED 25, 26 of the measuring optical system 9R in order. In this case, after the measuring luminous flux from the LED 25 is reflected by the dichroic mirror 14 and the total reflection mirror 15, the measuring luminous flux is projected onto the eyeglass lens RL by being converted into the parallel pencil with the collimator lens 27. In accordance with this, the measuring luminous flux penetrating the eyeglass lens RL becomes a lot of measuring luminous flux by penetrating the pattern plate 28, and then this measuring luminous flux is projected onto the top surface of the field lens 29. The measuring luminous flux projected onto the top surface of the field lens 29 is guided to the CCD 24 through the field lens 29, reflection mirrors 30, 31, prism for synthesizing an optical path 22, and imaging lens 23. In this case, the pattern image of the pattern plate 28 is imaged on the CCD 24 by the imaging lens 23.

After the measuring luminous flux from the LED 26 is reflected by the dichroic mirror 14R and the total reflection mirror 15, the measuring luminous flux is projected onto the eyeglass lens RL by being converted into the parallel pencil with the collimator lens 27.

Along this, the measuring luminous flux penetrating the eyeglass lens RL becomes a lot of measuring luminous flux by penetrating the pattern plate 28, and then the luminous flux is projected onto the top surface of the field lens 29. The measuring luminous flux projected onto the top surface of the field lens 29 is guided to the CCD 24 through the field lens 29, reflection mirrors 30, 31, prism for synthesizing an optical path 22, and imaging lens 23. In this case, the pattern image of the pattern plate 28 is imaged onto the CCD 24 by the imaging lens 23.

The arithmetic and control circuit 80 measures the refracting characteristics of each portion of the eyeglass lens RL from the pattern image imaged onto the CCD 24, and then the arithmetic and control circuit 80 obtains the mapping data of the refracting characteristic of each portion of the eyeglass lens RL. The refracting characteristics include spherical diopter power (S), cylindrical degree (C), cylindrical axis angle (A), and the like.

In this case, the refracting characteristics of right eyeglass lens RL are obtained by corresponding to the right half pupillary distance RHPD, 31.5. The refracting characteristics are also obtained in the position for distance when the eyeglass lens RL is a progressive refracting lens.

Figure 24:
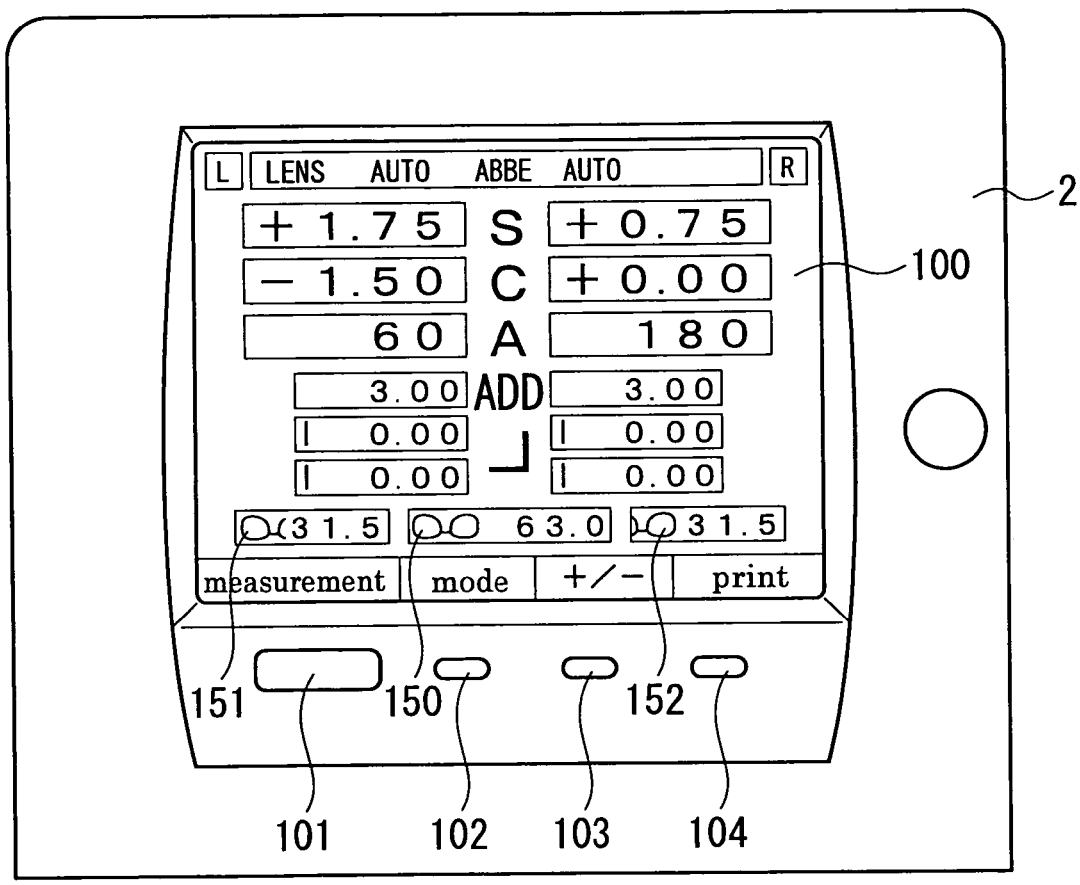
FIG. 24 is an explanation drawing illustrating a display example of a liquid crystal indicator of the lens-refracting characteristic measuring apparatus.

The arithmetic and control circuit 80 displays the refracting characteristics of the eyeglass lenses LL, RL obtained by the above described on the liquid crystal indicator 100 as shown in FIG. 24.

In FIG. 24, Left indicating the left eyeglass lens LL is displayed on the left side of the top edge of the liquid crystal indicator 100, and Right indicating the right eyeglass lens RL is displayed on the right side of the top edge of the liquid crystal indicator 100.

Characters such as S (spherical diopter power), C (cylindrical degree), A (axis angle of cylindrical axis), ADD (addition), and the like are displayed in the middle of the liquid crystal indicator 100. Numerical data (measuring data) of right and left eyeglass lenses LL, RL are respectively displayed on the right and left of S, C, A, ADD.

In FIG. 24, S of the left eyeglass lens LL is displayed as +1.75, C as −1.50, A as 60, and ADD as 3.00. S of the right eyeglass lens RL is also displayed as +1.75, C as +0.00, A as 180, and ADD as 3.00.

In the lower portion of the above numerical data, LPD (optical center distance) between the right and left eyeglass lenses LL, RL, left half LLHPD and right half RLHPD from the center between the eyeglass lenses LL, RL to the optical centers of the eyeglass lenses LL, RL are displayed. The left half LLHPD and right half RLHPD are displayed on the right and left of the optical center distance LPD in the middle.

The measuring data (numerical data) of optical center distance LPD is displayed on the right side of the frame shape 150 of the eyeglass frame MF. The left half LLHPD is displayed on the right side of the left half frame shape 151 of the eyeglass frame MF. The right half RLHPD is displayed on the right side of the right half frame shape 152 of the eyeglass frame MF. In FIG. 24, the LPD is displayed as 63, the LLHPD is displayed as 31.5, and RLHPD is displayed as 31.5.

The LLHPD, 31.5, the LPD, 63, and the RLHPD, 31.5 correspond to the above described LHPD, 31.5, PD, 63, and RHPD, 31.5.

The inputting devices such as the measuring switch 101, mode switching switch 102, switch 103, and printing switch 104 corresponding to measurement, mode, +/−, print are displayed in the lower edge portion (lower end portion) of the liquid crystal indicator 100.

Figure 25:
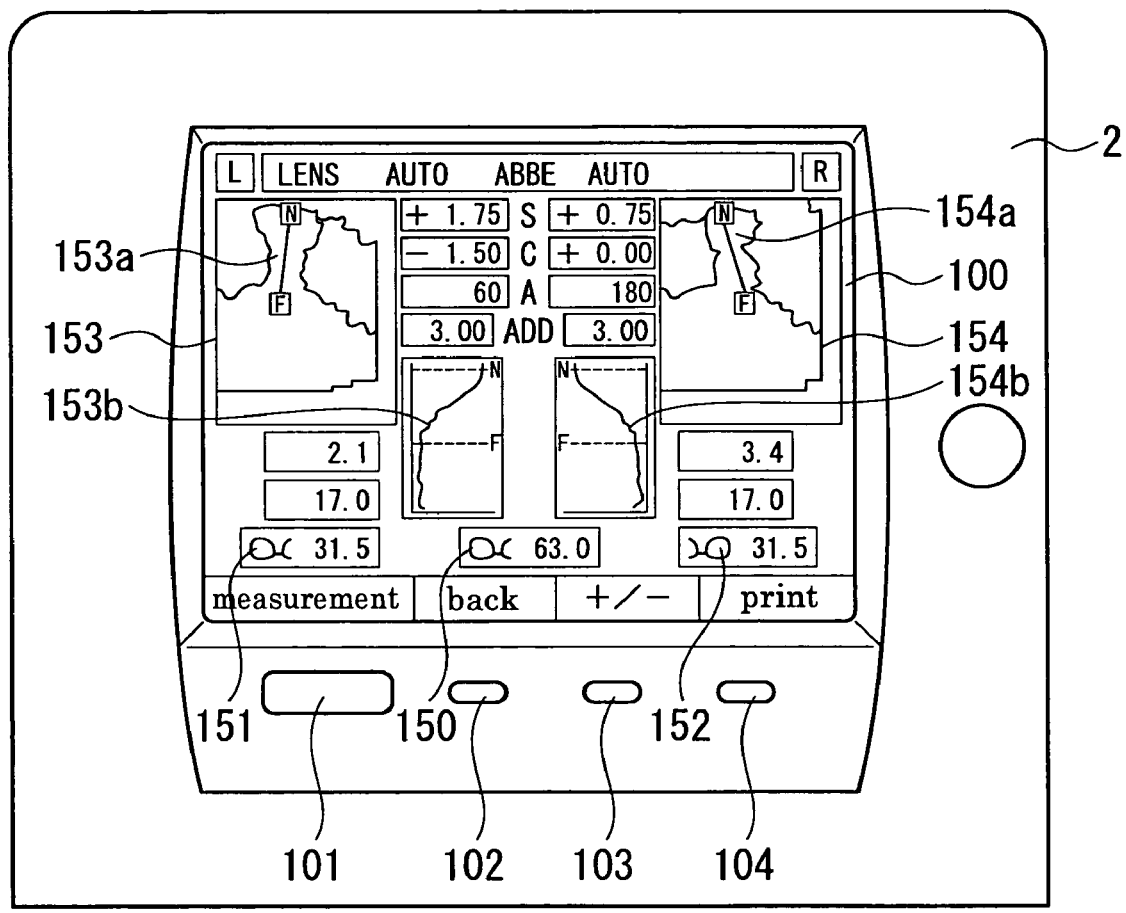
FIG. 25 is an explanation drawing when switching a display mode of the liquid crystal indicator shown in FIG. 24.

When the arithmetic and control circuit 80 operates (presses) the mode switching switch 102, the circuit 80 can switch the display of the measuring result as shown in FIG. 25. In FIG. 25, in addition to the display of FIG. 24, mapping images 153, 153 of the refracting degree of the right and left eyeglass lens LL, RL are displayed on the right and left of the measuring data S, C, A, ADD. The mapping images 153, 154 in FIG. 25 indicate the display examples based on the measuring data when the eyeglass lenses LL, RL are the progressive refracting lenses.

When the eyeglass lenses LL, RL are the progressive refracting lenses, additional changing graphs 153b, 154b showing the changes in the additional of progressive portions 153a, 154a from the near point (N) to the far point (F) are displayed on the liquid crystal indicator 100 in the lower portion of the measuring data of ADD of the right and left eyeglass lenses LL, RL.

The additional of the near point (N) and the far point (F) are respectively displayed in the side portions of the additional changing graphs 153b, 154b. In FIG. 24, the near point (N) and the far point (F) of the additional changing graphs 153b are respectively displayed as 2.1 and 17.0, and the near point (N) and the far point (F) of the additional changing graphs 154b are respectively displayed as 3.1 and 17.0.

Moreover, the eyeglasses 5 of the above embodiment comprise the eyeglass frame MF that the eyeglass lenses LL, RL are framed in the lens frames LF, RF. In the embodiment described above, the refracting characteristics of the eyeglasses 5 having the eyeglass frame MF are measured; however it is not limited thereto.

For instance, eyeglasses with rimless frames can be measured. In other words, without disposing the lens frames LF, RF, eyeglasses with two points frames in which a bridge or temple mounting metal part are fixed to the eyeglass lenses LL, RL directly by a screw can be measured. In this case, the eyeglass lenses LL, RL are directly supported by the frame support members 111, 111.

In the embodiment described above, the refracting characteristics and the mapping data of the right and left lenses LL, RL of the eyeglasses can be measured simultaneously; however, it is not limited thereto. The lens-refracting characteristics measuring apparatus can be constructed to measure the eyeglass lenses LL, RL one by one as illustrated in FIG. 29, for example.

Figure 29:
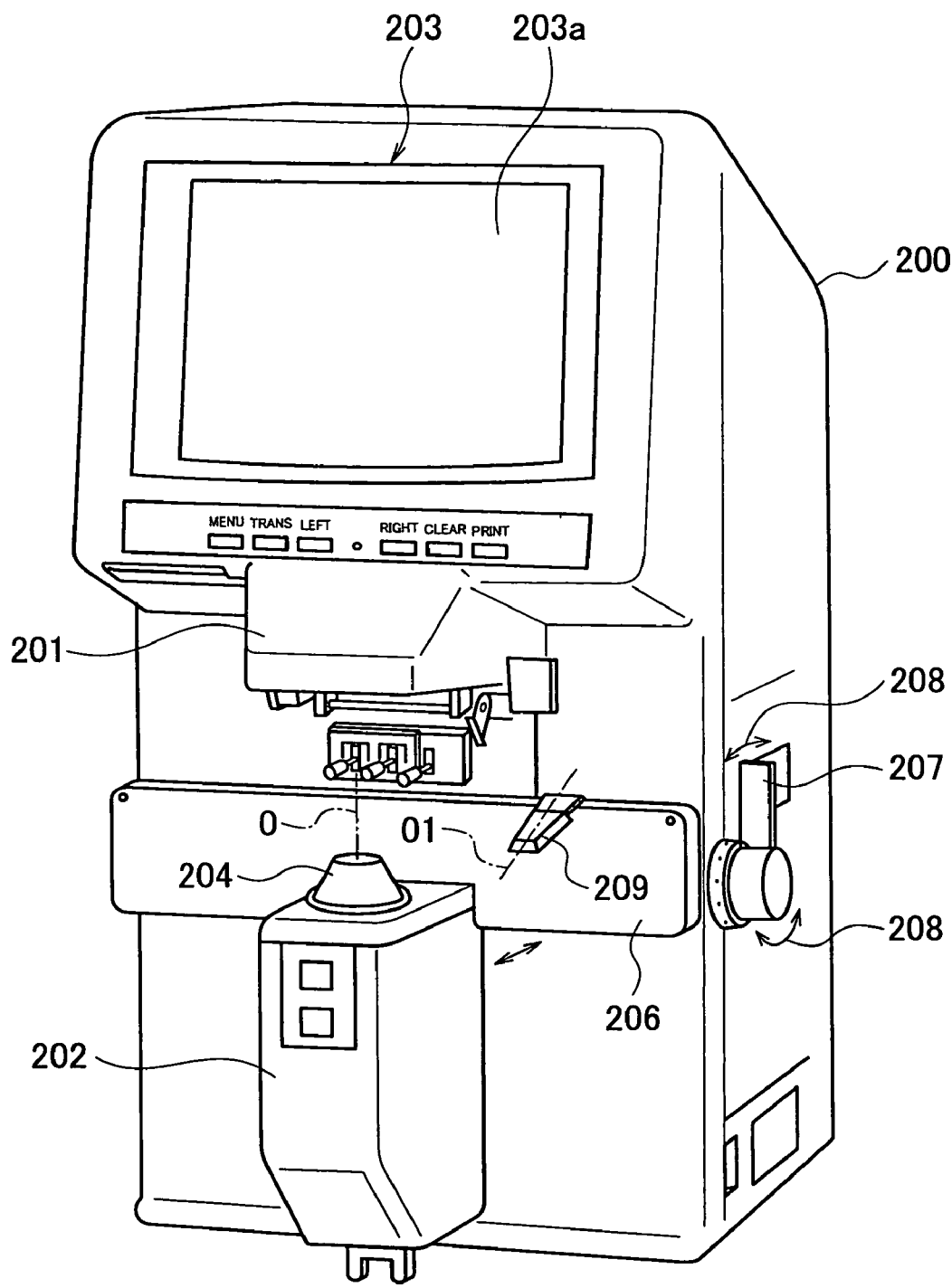
FIG. 29 is a perspective view of the lens-refracting characteristic measuring apparatus showing a modification example of the embodiment of the present invention.

The lens-refracting characteristic measuring apparatus in this embodiment comprises an upper case portion 201 disposed in an intermediate portion of a front face of a body case 200, a lower case portion 202 provided in the lower portion of the front face of the body case 200, a display device 203 disposed in the upper portion of the front face of the body case 200, as shown in FIG. 29. The display device 203 includes, for example, a liquid crystal display indicator.

The upper surface of the lower case portion 202 is provided with a tubular lens supporting member 204. A projecting optical mechanism (not shown) for projecting measuring luminous flux with respect to the lens tubular lens supporting member 204 and a lens placed onto the lens supporting member 204 is disposed in the upper case body 201. A light-receiving optical mechanism (not shown), which is constructed to guide the measuring luminous flux penetrating the lens placed onto the tubular lens supporting member 204 to the light receiving element 205 such as CCD, is provided in the lower case body 202.

The projecting optical mechanism and light-receiving optical mechanism construct a measuring optical device as described above. The measuring optical axis O of the measuring optical device aligns with the center of the tubular lens supporting member 201.

The front face of the body case 200 is equipped with a lens table 206 between the upper case body 201 and the lower case body 202. The lens table is mounted to be movable back and forth. The lens table 206 extends right and left and moves back and forth by turning a lever 207, provided in the side portion of the body case 200, back and forth as shown by the arrow 28.

A known construction can be adopted for the above structure; therefore, the detailed description will be omitted.

Figure 30:
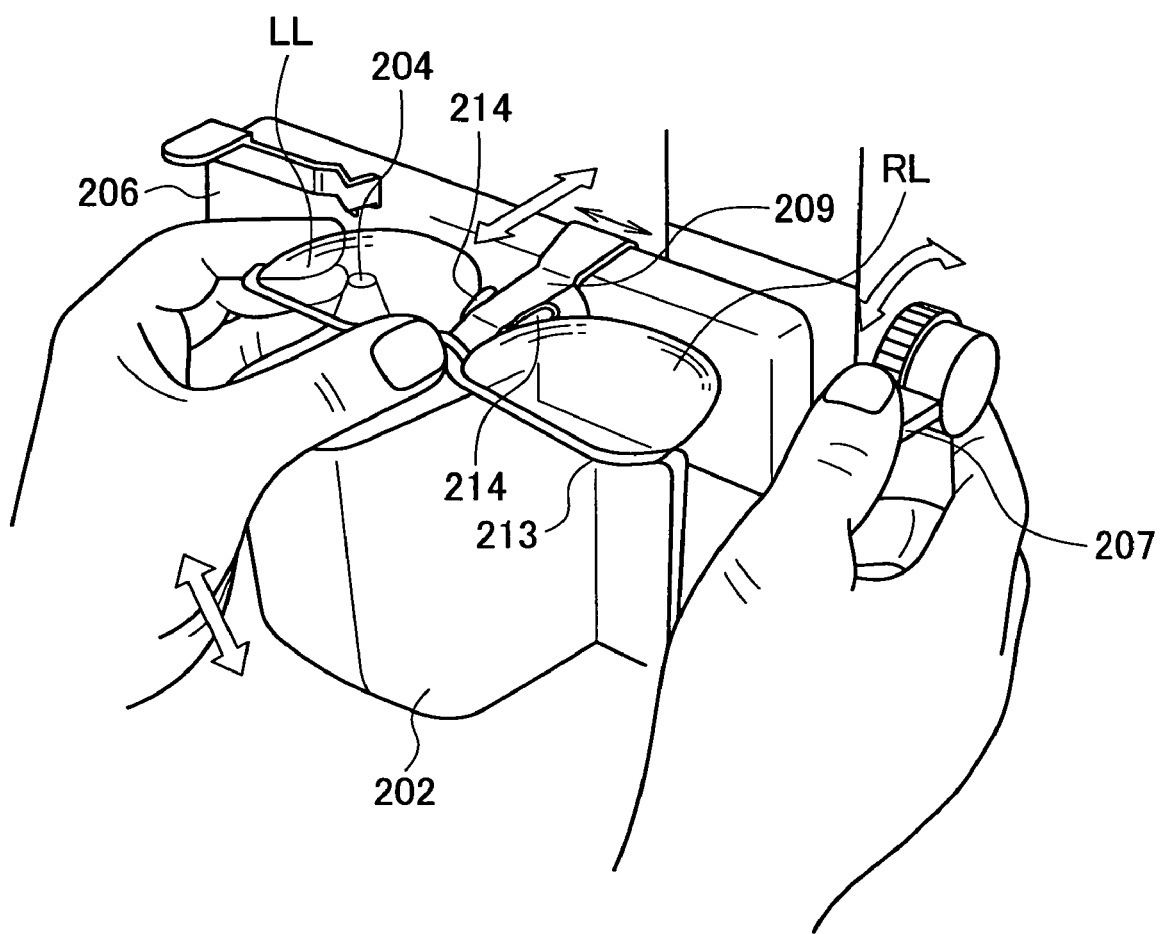
FIG. 30 is a partially enlarged view showing a using condition of the lens-refracting characteristic measuring apparatus illustrated in FIG. 29.

Moreover, the upper edge portion of the lens table 206 is equipped with a nose pad supporting member 209, which can displace in the right and left, as shown in FIGS. 29, 30.

Figure 31:
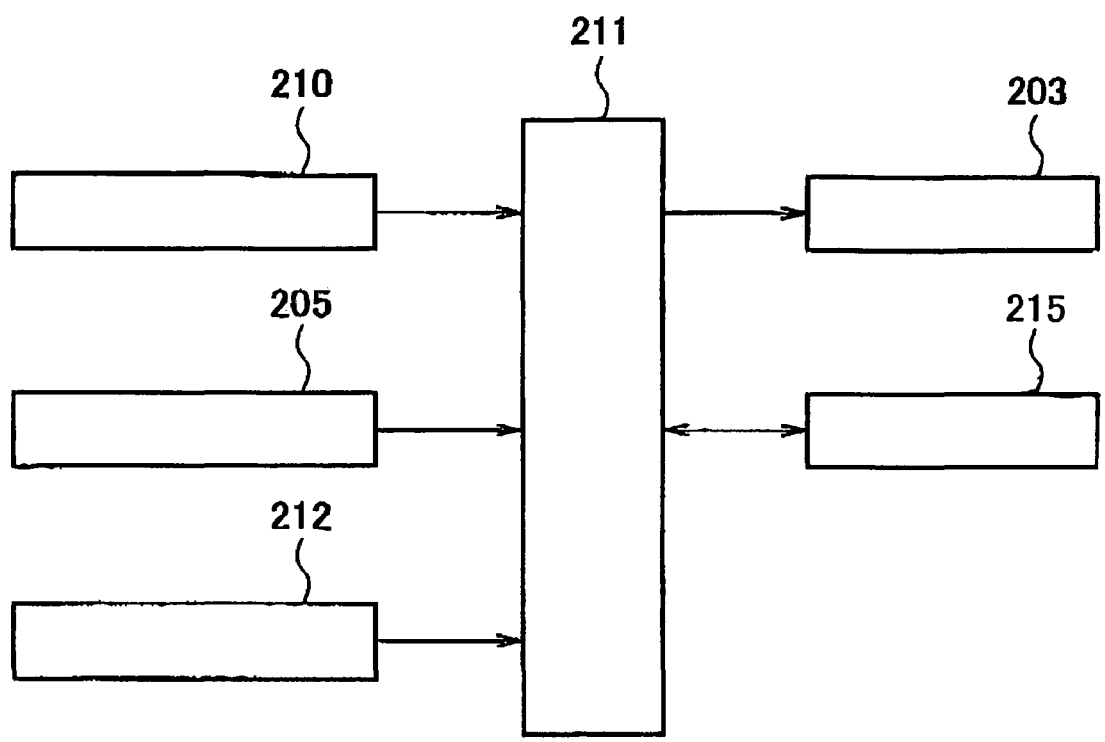
FIG. 31 is a control circuit view of the lens-refracting characteristic measuring apparatus illustrated in FIG. 29.
Figure 32:
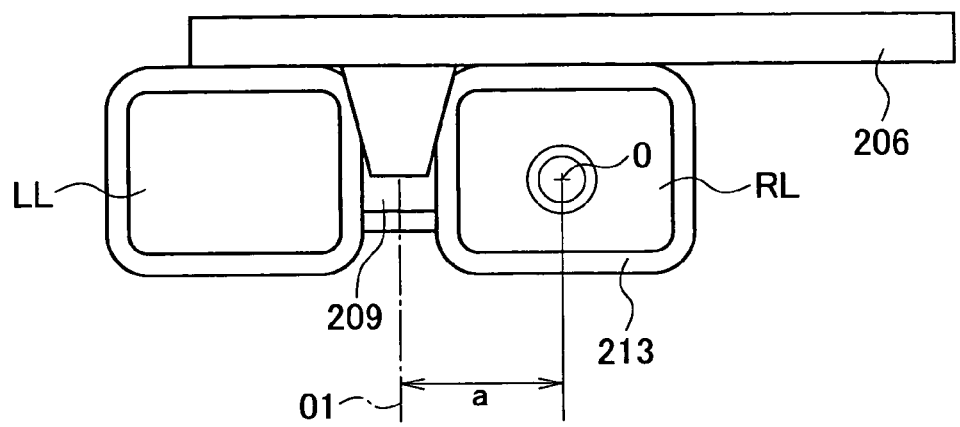
FIG. 32 is an explanation view for a function of the lens-refracting characteristic measuring apparatus in FIG. 29.

The displaced amount in the right and left direction of the nose pad supporting member 209 is detected by a displaced amount detecting device 210 in FIG. 31. As the displaced amount detecting device 210, a potentiometer disclosed in Japanese Patent Laid-Open H08-29292 is adopted, so that the detailed description will be omitted.

The displaced amount detecting signal from the displaced amount detecting device 210 and the refracting power measuring signal from the light receiving element 205 are input to an arithmetic and control circuit 211 shown in FIG. 31. The arithmetic and control circuit 211 obtains refracting characteristics of eyeglass lenses on the measuring optical axis O based on the refracting power measuring signal from the light receiving element 205, and then displays the obtained refracting characteristics on a screen 203a of the liquid crystal indicator 203. The refracting characteristics includes the above described S, C, A, ADD, and the like.

Data such as the pupillary distance PD or half pupillary distance LHPD, RHPD measured by a data inputting device 212 such as a refractometer or PD meter is input to the arithmetic and control circuit 211.

Moreover, the arithmetic and control circuit 211 obtains distance a from the measuring optical axis O to the c enter O1 of the moving direction of the nose pad supporting member 209 based on the displaced amount detecting signal from the displaced amount measuring device 210.

Figure 33:
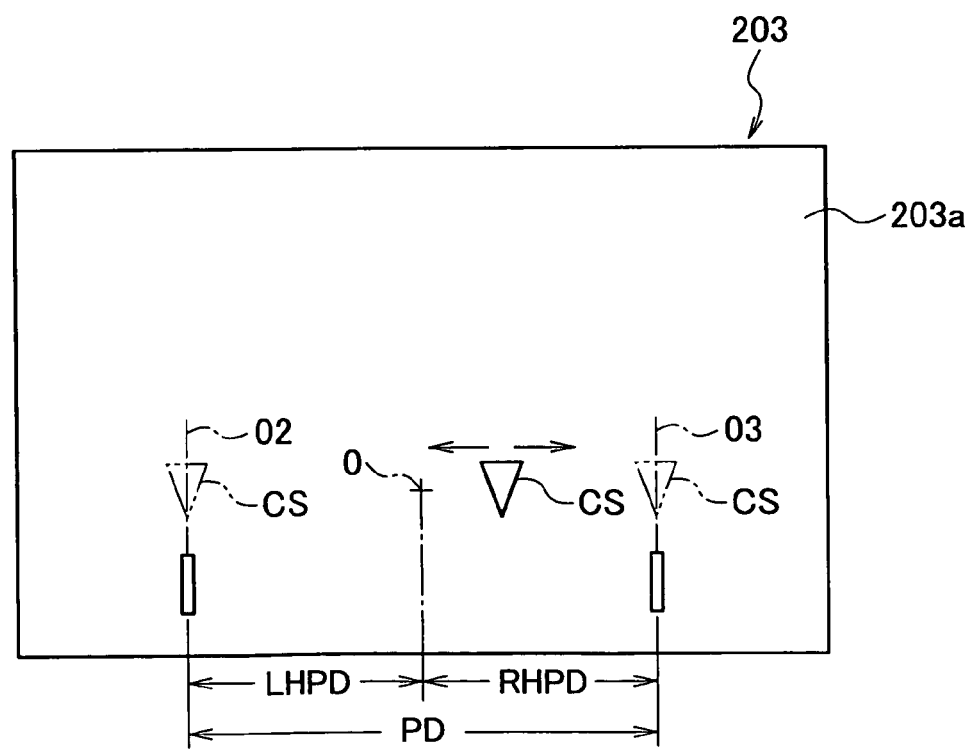
FIG. 33 is an explanation drawing showing a display example to a display device of the lens-refracting characteristic measuring apparatus illustrated in FIG. 29.

When the data such as the pupillary distance PD or half pupillary distances LHPD, RHPD measured by a the data inputting device 212 is input, the arithmetic and control circuit 211 displays the marks Ml, M2 indicating the measuring positions based on the half pupillary distance LHPD, RHPD shown in FIG. 33, and displays the cursor CS showing the center O1 of the moving direction of the nose pad supporting member 209 on the screen 203a of the liquid crystal indicator 203.

The cursor CS moves in the direction opposite to the moving direction of the nose pad supporting member 209 on the screen 203a. Therefore, if the eyeglasses 213 is displaced together with the nose pad supporting member 209 in the right and left direction by abutting nose pads 214, 214 of the eyeglasses 213 to the nose pad supporting member 209 as shown in FIG. 30, the cursor CS moves in the direction opposite to the moving direction of the eyeglasses 213 on the screen 203a.

The arithmetic and control circuit 211 stores the refracting characteristics of lenses LL, RL of the eyeglasses 213 when the cursor CS aligns with the centers O2, O3 of the mark M1, M2 shown by chain double-dashed lines in a memory 123, and displays the refracting characteristics on the liquid crystal indicator 203.

As described above, the lens-refracting characteristic measuring apparatus according to the present invention comprises the measuring optical systems 9L, 9R including the projecting optical mechanisms 10L, 10R and the light-receiving optical mechanisms 11L, 11R provided in the body case 1 and 200, the lens supporting members 17a, 28a, 204 disposed between the projecting optical mechanisms 10L, 10R and the light-receiving optical mechanisms 11L, 11R, the light receiving element, i.e., the CCD 24 for receiving the measuring luminous flux which is projected with respect to the eyeglass lenses LL, RL abutted on the lens supporting members 17a, 28a, 204 and is guided from the light receiving optical mechanism 11L, 11R by penetrating the eyeglass lens LL, RL, and the arithmetic and control circuit 80, 211 for obtaining the refracting characteristics of the eyeglass lenses LL, RL from the measuring signal output from the CCD 24. The pupillary distance measuring device inputs the half pupillary distances LHPD, RHPD from the center of the nose of a person wearing the eyeglasses having the eyeglass lenses LL, RL to the centers of the right and left pupils to the arithmetic and control circuit. The arithmetic and control circuits 80, 211 can obtain the refracting characteristics of the positions corresponding to the centers of the pupils of the eyeglass lenses LL, RL based on the half pupillary distances LHPD, RHPD.

According to this construction, the eyeglass lens-refracting characteristics can be measured in the positions corresponding to the centers of the pupils of a person wearing eyeglasses.

In one embodiment of the lens-refracting characteristic measuring apparatus according to the present invention, the pupillary distance measuring device is disposed in the body cases 1, 200.

According to this construction, the half pupillary distances LHPD, RHPD measured by a refractometer or PD meter can be input to the arithmetic and control circuit by the mode switching switches 102, 103, 104, with hands.

The pupillary distance measuring apparatus can be provided separately from the body cases 1, 200, and can input the measured half pupillary distances LHPD, RHPD of a person wearing eyeglasses to the arithmetic and control circuits 80, 211. In details, the sendable and transferable external pupillary distance measuring device comprises the refractometer, PD meter, and data inputting device 212, for example.

According to this construction, the pupillary distances, LHPD, RHPD measured by the refractometer, PD meter, or data inputting device 212 can be automatically input by sending and transferring; therefore, it is not necessary to input the pupillary distances LHPD, RHPD to the arithmetic and control circuits 80, 211 by hands.

In the lens-refracting characteristic measuring apparatus according to the present invention, the center of the lens supporting device is disposed in the measuring optical axis O of the measuring optical system. The lens supporting device comprises the tubular lens supporting member 204 for receiving a lens of eyeglasses, the nose pad supporting member 209 which supports the nose pads of eyeglasses having the lenses abutted onto the tubular lens supporting member 204 and can be moved right and left, and the displaced amount detecting device 210 to detect the displaced amount from the measuring optical axis to the right and left direction of the nose pad supporting member 209. The nose pad supporting member 209 is disposed to be movable in the right and left direction by a driving device (not shown).

When the displaced amount of the nose pad supporting member 209 based on the displaced amount detecting signal of the displaced amount detecting device 210 agrees with the half pupillary distances LHPD, RHPD, the arithmetic and control circuit 211 displays this agreement on the liquid crystal indicator 203.

According to this construction, the agreement of the displaced amount of the nose pad supporting member 209 and the half pupillary distances LHPD, RHPD can be known from the display of the liquid crystal indicator 203, so that the measuring operation can be promptly performed.

The arithmetic and control circuit 211 controls the driving mechanism based on the half pupillary distances LHPD, RHPD, and can measure the refracting characteristics of eyeglass lenses LL, RL by moving the nose pad supporting member 209 from the measuring optical axis O to the half puillary distances LHPD, RHPD.

According to this construction, the refracting characteristics of eyeglass lenses LL, RL can be precisely and automatically measured in the positions corresponding to the centers of pupils of a person wearing eyeglasses.

Here, the nose pad supporting member 209 can be disposed to be drivable right and left by a driving motor by providing a holding device to stably hold the eyeglasses horizontally to the nose pad supporting member 209.

As a construction for stably supporting eyeglasses, the construction disclosed in Japanese Patent Laid-Open S63-113419 can be adopted, for example. In this case, the nose pad supporting member 209 installed in the lens table 206 in FIG. 29 is removed, and the lens table 206 is disposed to be movable back and forth, in other words, in the Y axis direction by the Y driving motor. Moreover, a moving plate (hand opening and closing portion) in which a pair of supporting arms (hand) for respectively supporting the right and left lens frames of eyeglasses or the eyeglass lenses is provided. This moving plate is provided in a lens table (X axis feeding mechanism) 206 to be movable in the right and left direction (X axis direction), and the moving plate is disposed to be movable in the right and left direction (X axis direction) by the X driving motor. The above described nose pad supporting member 209 is mounted on this moving plate to be movable in the right and left direction. The lens-refracting characteristic measuring apparatus includes a plate displaced amount detecting device to obtain the displaced amount of the moving plate in the right and left direction with respect to the lens table 206, and the nose pad displaced amount detecting device to detect the displaced amount of the nose pad supporting member in the right and left direction with respect to the moving plate. The plate displaced amount detecting signal output from the plate displaced amount detecting device and the nose pad displaced amount detecting signal output from the nose pad displaced amount detecting device are input to the arithmetic and control circuit 211, and then the displaced amount from the measuring optical axis O to the nose pad supporting member in the right and left direction can be obtained based on the plate displaced amount detecting signal and the nose pad displaced amount detecting signal.

The arithmetic and control circuit 211 moves and controls the x driving motor and Y driving motor based on the half pupillary distances LHPD, RHPD, so that the arithmetic and control circuit 211 can measure the refracting characteristics of eyeglass lenses LL, RL by shifting the nose pad supporting member 209 from the measuring optical axis O to the half pupillary distances LHPD, RHPD.

In the lens-refracting measuring apparatus of the present invention, when measuring a progressive refracting lens, the arithmetic and control circuits 80, 211 are constructed to obtain the refracting characteristics of the portions for distance of eyeglass lenses LL, RL in the positions corresponding to the half pupillary distances LHPD, RHPD.

According to this construction, the refracting characteristics of the portions for distance of eyeglass lenses LL, RL can be preciously measured in the positions corresponding to the centers of pupils of a person wearing eyeglasses.

Moreover, when measuring the progressive refracting lens, by changing the measuring mode to the measuring mode for a progressive refracting lens, the arithmetic and control circuits 80, 211 detect the progressive portions, and then obtain the additional ADD of the progressive portions. The arithmetic and control circuits 80, 211 also detect the ranges of the portions for distance from the change in the additional ADD, and then the arithmetic and control circuits 80, 211 can obtain the refracting characteristics of the portions for distance of the eyeglass lenses LL, RL in the portions of the half pupillary distances LHPD, RHPD.

In the lens refracting characteristic measuring apparatus according to the present invention, a luminous flux dividing mechanism, i.e., the pattern plates 17, 28 for forming the measuring luminous flux into a plurality of measuring luminous flux having the widespread of distribution are provided. The arithmetic and control circuit 80 obtains refracting power distribution states by measuring the refracting characteristics of a plurality of positions in the eyeglass lenses LL, RL based on a plurality of measuring luminous flux. The arithmetic and control circuit 80 obtains the refracting characteristics in the positions corresponding to the centers of pupils of the eyeglass lenses LL, RL based on this refracting power distribution states and the half pupillary distances LHPD, RHPD. Moreover, the luminous flux dividing mechanism, i.e., the pattern plates 17, 28 are provided in the projecting optical mechanisms 10L, 10R and also in the light-receiving optical mechanisms 11L, 11R.

According to this structure, the refracting power distribution states of the eyeglass lenses LL, RL can be obtained by obtaining the refracting characteristics in a plurality of positions of the eyeglass lenses LL, RL by projecting a plurality of measuring luminous flux divided by the luminous flux dividing mechanism, i.e., the pattern plates 17, 28 or by dividing the measuring luminous flux penetrating the widespread portion of eyeglass lenses, LL, RL.

The mapping of the refracting characteristics of eyeglass lens LL, RL can be performed from the refracting power distribution states of eyeglass lenses LL, RL. Further, the refracting characteristics of eyeglass lens LL, RL can be precisely measured in the positions corresponding to the centers of the pupils of a person wearing eyeglasses from the refracting characteristics distribution states of the eyeglass lenses LL, RL and the half pupillary distances LHPD, RHPD.

The refracting power distribution states of eyeglass lenses LL, RL are stored or recorded on a recording media, for example, a memory 215, hard disk, magnetic disk, optical magnetic disk, and the like. Therefore, after the mapping of the refracting characteristics of the eyeglass lenses LL, RL is performed, even though the half pupillary distances LHPD, PRPD are input, the refracting characteristics of eyeglass lenses LL, RL can be preciously measured in the positions corresponding to the centers of pupils of a person wearing eyeglasses based on the input half pupillary distances LHPD, RHPD, and the refracting power distribution state data.

In case of measuring progressive refracting lenses, the arithmetic and control circuit 80 obtains the refracting characteristics of the portions for distance of eyeglass lenses LL, RL in the positions of the half pupillary distances LHPD, RHPD.

According to this structure, the refracting characteristics of the portions for distance of eyeglass lenses LL, RL can be preciously measured in the positions corresponding to the centers of pupils of a person wearing eyeglasses from the refracting power distribution states of the eyeglass lenses LL, RL and the half pupillary distances LHPD, RHPD.

As described above, according to the present invention, the lens-refracting characteristics can be preciously and promptly measured in the position corresponding to the centers of pupils of eyes for a person wearing eyeglasses.

The preferable embodiments according to the present invention have been described. However, the present invention is not limited to the above embodiments, and various changes and modifications are applied to the above embodiments.

What is claimed is:

1. A lens-refracting characteristic measuring apparatus, comprising:
   a measuring optical device to measure refracting characteristics of eyeglass lenses;
   an input device to input a pupillary distance of eyes of a person wearing eyeglasses; and
   an arithmetic and control circuit for obtaining refracting characteristics of the eyeglass lenses in positions of centers of right and left pupils of the person wearing the eyeglasses based on the pupillary distance of right and left eyes of the person wearing the eyeglasses input by the input device and the refracting characteristics measured by the measuring optical device.

2. The lens-refracting characteristic measuring apparatus according to claim 1, wherein
   the measuring optical device comprises a projecting optical mechanism for projecting light to a lens and a light-receiving optical mechanism for receiving the light from the lens, and
   the light receiving optical mechanism comprises a light receiving element which converts a shape of the lens into an image signal, and then inputs the image signal into the arithmetic and control circuit.

3. The lens-refracting characteristic measuring apparatus according to claim 2, wherein the light receiving optical element comprises a charge-coupled device (CCD).

4. The lens-refracting characteristic measuring apparatus according to claim 1, wherein the input device inputs half pupillary distances from a center of a nose to the centers of the right and left pupils of the person wearing the eyeglasses to the arithmetic and control circuit.

5. The lens-refracting characteristic measuring apparatus according to claim 1, further comprising a display device to display at least a measuring result by the arithmetic and control circuit.

6. The lens-refracting characteristic measuring apparatus according to claim 1, further comprising a lens supporting device disposed to support the eyeglass lenses when the eyeglass lenses are measured by the measuring optical device.

7. The lens-refracting characteristic measuring apparatus according to claim 6, wherein the lens supporting device comprises
- a tubular lens supporting member disposed in a center of a measuring optical axis of the measuring optical device,
- a nose pad supporting member, which supports nose pads of the eyeglasses supported by the tubular lens supporting member, to be movable right and left,
- a driving mechanism for driving the nose pad supporting member, and
- a displaced amount detecting device to detect a displaced amount of the nose pad supporting member in a right and left direction from the measuring optical axis.

8. The lens-refracting characteristic measuring apparatus according to claim 7, wherein when the displaced amount of the nose pad supporting member based on a displaced amount detecting signal of the displaced amount detecting device agrees with half pupillary distances from a center of a nose to the centers of the right and left pupils of the person wearing the eyeglasses, the arithmetic and control circuit displays the agreement on a display device.

9. The lens-refracting characteristic measuring apparatus according to claim 7, wherein the arithmetic and control circuit controls the driving mechanism based on half pupillary distances from a center of a nose to the centers of the right and left pupils of the person wearing the eyeglasses, and measures the refracting characteristics of the eyeglass lenses by shifting the nose pad supporting member from a measuring optical axis for the half pupillary distances.

10. The lens-refracting characteristic measuring apparatus according to claim 1, wherein when measuring progressive refracting lenses, the arithmetic and control circuit obtains refracting characteristics of portions for distance of the eyeglass lenses in the positions corresponding to half pupillary distances from a center of a nose to the centers of the right and left pupils of the person wearing the eyeglasses.

11. The lens-refracting characteristic measuring apparatus according to claim 1, further comprising a luminous flux dividing mechanism for forming a measuring luminous flux of the measuring optical device in a plurality of measuring luminous flux which is widely distributed, wherein the arithmetic and control circuit obtains a refracting power distribution state by measuring the refracting characteristics in a plurality of portions of the eyeglass lenses based on the plurality of measuring luminous flux, and obtains the refracting characteristics in the positions corresponding to the centers of the right and left pupils of the eyeglass lenses based on the refracting power distribution state and half pupillary distances from a center of a nose to the centers of the right and left pupils of the person wearing the eyeglasses.

12. The lens-refracting characteristic measuring apparatus according to claim 1, wherein when measuring progressive refracting lenses, the arithmetic and control circuit obtains refracting characteristics of portions for distance of the eyeglass lenses based on half pupillary distances from a center of a nose to the centers of the right and left pupils of the person wearing the eyeglasses.

13. The lens-refracting characteristic measuring apparatus according to claim 1, further comprising a shielding device to shield a part of the eyeglass lenses when measuring the eyeglass lenses.

14. The lens-refracting characteristic measuring apparatus according to claim 1, wherein the refracting characteristic is a spherical diopter power, cylindrical degree, or cylindrical axis angle of the eyeglass lenses.

* * * * *